United States Patent [19]
Sasaki et al.

[11] Patent Number: 5,447,209
[45] Date of Patent: Sep. 5, 1995

[54] HYDRAULIC POWER STEERING DEVICE

[75] Inventors: Hiroto Sasaki; Osamu Sano, both of Nara, Japan

[73] Assignee: Koyo Seiko Co., Ltd., Osaka, Japan

[21] Appl. No.: 202,507

[22] Filed: Feb. 28, 1994

[30] Foreign Application Priority Data

| Feb. 26, 1993 | [JP] | Japan | 5-063254 |
| Mar. 10, 1993 | [JP] | Japan | 5-077547 |
| Oct. 14, 1993 | [JP] | Japan | 5-282073 |
| Dec. 27, 1993 | [JP] | Japan | 5-354053 |

[51] Int. Cl.⁶ .................................. B62D 5/083
[52] U.S. Cl. ............................ 180/132; 180/142; 91/375 A; 137/625.23
[58] Field of Search .......... 180/132, 141, 142, 143; 91/375 A; 137/625.23

[56] References Cited

U.S. PATENT DOCUMENTS

| 4,561,521 | 12/1985 | Duffy | 180/142 |
| 4,570,735 | 2/1986 | Duffy | 180/142 |
| 4,570,736 | 2/1986 | Waldorf | 180/143 |
| 4,730,687 | 3/1988 | Chikuma et al. | 180/142 |
| 5,253,729 | 10/1993 | Suzuki | 180/142 |
| 5,259,413 | 11/1993 | Harpole et al. | 91/375 A |

FOREIGN PATENT DOCUMENTS

| 083490 | 7/1983 | European Pat. Off. . |
| 61-139563 | 6/1986 | Japan . |
| 61-163062 | 7/1986 | Japan . |
| 2-306878 | 12/1990 | Japan . |
| 2306878 | 12/1990 | Japan . |

*Primary Examiner*—Kevin T. Hurley
*Attorney, Agent, or Firm*—Popham, Haik, Schnobrich & Kaufman, Ltd.

[57] ABSTRACT

The hydraulic control valve 30 of a hydraulic actuator 20 for generating steering assist force comprises a first valve member 31 and a second valve member 32, both of which are rotatable relative to each other in response to steering resistance. Throttling portions are formed of spaces between axially extending edges defined by slots of the first valve member and axially extending edges defined by slots of the second valve member. The first hydraulic oil outlet slot 51b is located between a right turn slot 50a and a left turn slot 50b. The second hydraulic oil outlet slot 51c is located between communication slots 50c. Hydraulic oil feed slots 51a are located between a right turn slot 50a and a communication slot 50c and between a left turn slot 50b and a communication slot 50c. A closing angle of at least one type of second group throttling portions A', B', C' and D' is set larger than a closing angle of each of a first group throttling portions A, B, C and D. A variable throttle valve 60, capable of varying the flow area of its own throttling portion in response to driving conditions, is disposed between the second group throttling portions A', B', C' and D' and the tank 71.

9 Claims, 22 Drawing Sheets

Prior Art

HYDRAULIC POWER STEERING DEVICE

FIELD OF THE INVENTION

The present invention relates to a hydraulic power steering device which provides steering assist force in response to steering resistance and driving conditions such as vehicle speed, angle of steer, and so on.

DESCRIPTION OF THE RELATED ART

A hydraulic power steering device, which has been conventionally used, comprises a hydraulic actuator and a control valve which controls hydraulic pressure acting on the hydraulic actuator in response to steering resistance, whereby the hydraulic power steering device generates greater steering assist force by increasing hydraulic pressure acting on the hydraulic actuator as steering resistance increases.

A rotary valve, which comprises a cylindrical first valve member and a second valve member which is inserted in the first valve member so as to be rotatable relative to the first valve member in accordance with steering resistance, is employed as such a control valve wherein a plurality of throttling portions are formed between the inner circumference of the first valve member and the outer circumference of the second valve member. The flow area of each of the throttling portions varies in response to the angle of relative rotation between both valve members. Each throttling portion is disposed in an oil flow path which connects a pump, a tank and the hydraulic actuator to each other in order to generate steering assist force according to a direction of steer and steering resistance.

In the above described hydraulic power steering device equipped with the control valve, Unexamined Japanese Patent Publication Sho No. 61-139563, U.S. Pat. No. 4,561,521, Unexamined Japanese Patent Publication Sho No. 61-163062, U.S. Pat. Nos. 4,570,735 and 4,570,736 disclose arrangements in order to achieve fast response characteristic in steering operation at low driving speeds and stable response characteristic in steering operation at high driving speeds.

In the disclosed arrangements, the throttling portions disposed between both valve members are grouped into a first group and a second group, and a variable throttle valve, which can vary the flow area of its own throttling portion, is disposed in an oil flow path between the second group throttle portions and the pump. Also, a plurality of slots circumferentially spaced to each other are formed on the inner circumference of the first valve member and on the outer circumference of the second valve member, and spaces between the axially extending edges defined by the slots of the first valve member and the axially extending edges defined by the slots of the second valve member constitute throttling portions, whereby flow area of each of the throttling portions varies in response to the relative rotation between both valve members depending on the steering resistance.

A closing angle of each of the second group throttling portions is set larger than a closing angle of each of the first group throttling portions (The "closing angle" in the context of the present invention means an angle of relative rotation between both valve members required to fully close the throttling portion in the state of no steering resistance. It is not necessary for the actual throttling portion to be completely closed at its closed position. As far as function permits, a small open flow area may be allowed at its closed position.). The degree of opening of the variable throttle valve is set large at high vehicle driving speeds and set low at low vehicle driving speeds. Therefore, under low driving speed conditions, hydraulic pressure acting on the hydraulic actuator for generating steering assist force can be controlled in response to only the variation characteristic of the total flow area of the first group throttling portions. Thus, even when input torque for steering operation or angle of relative rotation between both valve members is small, the flow area of each of the throttling portions where pressure oil flows toward the tank becomes small. This increases the rate of increase of hydraulic pressure for generating steering assist force, so that fast response characteristic in steering operation can be achieved.

On the other hand, under high driving speed conditions, hydraulic pressure acting on the hydraulic actuator can be controlled in response to both of the variation characteristic of the total flow area of the first group throttling portions and the variation characteristic of the total flow area of the second group throttling portions. Thus, the flow area of the throttling portions where pressure oil flows toward the tank is kept large without being decreased, unless the angle of relative rotation between both valve members is increased by increasing input torque for steering operation. This restricts the rate of increase in hydraulic pressure for generating steering assist force, so that stable response characteristic in steering operation can be achieved.

However, since the variable throttle valve, which regulates the flow area of its own throttling portion in response to the vehicle driving conditions such as vehicle's speed, is disposed in the oil flow path between the second group throttling portions and the pump in the above unexamined Japanese Patent Publication Sho No. 61-163062 and U.S. Pat. No. 4,570,736, the power steering devices suffer cross-sectional elliptic deformation of the first valve member and the second valve member. Because, when the variable throttle valve's own throttling portion is closed at low driving speeds, hydraulic pressure in the oil path in which the second group throttling portions are disposed is lowered, so that the difference between hydraulic pressure at the oil path wherein the second group throttling portions are disposed and that at the oil path wherein the first group throttling portions are disposed is increased, and consequently unbalanced hydraulic pressure acts on the two valve members. The cross-sectional deformation of the two valve members to an elliptic form increases friction between the inner circumference of the first valve member and the outer circumference of the second valve member, so that a malfunction is caused.

The hydraulic power steering devices disclosed by the above unexamined Japanese Patent Publication Sho No. 61-139563, U.S. Pat. Nos. 4,561,521 and 4,570,735 are characterized in that the first group throttling portions are axially spaced apart from the second group throttling portions. Such an arrangement causes the enlargement of the axial dimensions of the device, as well as enlarging the overall dimensions of the device.

It has been proposed that the variable throttle valve, which regulates its own flow area in response to vehicle driving conditions such as the vehicle's speed, be disposed in an oil flow path between the second group throttling portions and the tank rather than the pump (unexamined Japanese Patent Publication Hei No. 2-306878 and U.S. Pat. No. 5,253,729).

To be more precise, FIG. 21 shows oil flow paths 504 and 505 between a pump 500 and a tank 501. Oil flow path 504 includes a first group of throttling portions A, B, C and D; and oil flow path 505 includes a second group of throttling portions A', B', C' and D'. Each of the oil flow paths 504, 505 is split into two branches, and each branch has two throttling portions connected in series. A variable throttle valve 502 is disposed between the second group throttling portions A', B', C' and D', and the tank 501. The junctions of series connected throttling portions of each branch of oil flow paths 504, 505 are connected to a hydraulic cylinder 503 for generating steering assist force. In right turn steering condition, the throttling portions A, A', D, D' are opened and the throttling portions B, B', C, C' are closed in response to steering resistance. In the left turn steering condition, the throttling portions A, A', D, D', are closed and the throttling portions B, B', C, C', are opened in response to steering resistance. The variable throttle valve 502's own throttling portion is fully closed at low driving speeds and fully opened at high driving speeds.

Under high driving speed conditions, the above arrangement allows the hydraulic pressure acting on the hydraulic cylinder 503 to be controlled in response to both of the variation characteristic of the total flow area of the first group throttling portions A, B, C, D and the variation characteristic of the total flow area of the second group throttling portions A', B', C', D'. Unless the angle of relative rotation between the two valve members is increased by increasing input torque for steering operation, the total flow area of the throttling portions B', C', where pressure oil flows toward the tank 501, is kept large without being decreased under right turn steering conditions, and the total flow area of the throttling portion A', D', where pressure oil flows toward the tank 501, is kept large without being decreased under left turn steering conditions. The rate of increase of hydraulic pressure for generating steering assist force therefore remains small, so that a stable response characteristic in steering operation can be achieved.

Under low driving speed conditions, the above arrangement allows the hydraulic pressure acting on the hydraulic cylinder 503 to be controlled in response to only the variation characteristic of the total flow area of the first group throttling portions A, B, C, D. Thus, even if input torque for steering operation and angle of relative rotation between the two valve members are small, the total flow area of throttling portions B, C where pressure oil flows toward the tank 501 becomes small under right turn steering conditions, and the total flow area of each of throttling portions A, D where pressure oil flows toward the tank 501 becomes small under left turn steering conditions. This increases the rate of increase of hydraulic pressure for generating steering assist force, so that a fast response characteristic in steering operation can be achieved. In this arrangement, even when the variable throttle valve's own throttling portion is closed at low driving speeds, the difference between the hydraulic pressure in the oil flow path where the first group throttling portions are disposed and the hydraulic pressure in the oil flow path where the second group throttling portions are disposed is not increased. This prevents the cross-sectional elliptical deformation of the first and second valve members.

However, in the hydraulic power steering device disclosed in the above unexamined Japanese Patent Publication Hei No. 2-306878 and U.S. Pat. No. 5,253,729, each of the inner circumference of the first valve member and the outer circumference of the second valve member is provided with ten slots, and blocks are arranged between the first group throttling portions A, B, C, D and the second group throttling portions A', B', C', D' so as to interrupt communication between the respective groups. The blocks make the circumferential arrangement of the throttling portions irregular. On the other hand, the hydraulic power steering devices disclosed by above unexamined Japanese Patent Publication Sho No. 61-139563, U.S. Pat. No. 4,561,521, unexamined Japanese Patent Publication Sho No. 61-163062, U.S. Pat. No. 4,570,735 and U.S. Pat. No. 4,570,736 can not control hydraulic pressure in response to driving conditions, if the variable throttle valve is disposed in the oil flow path between the second group throttling portions and the tank rather than the pump, because the structure disclosed by them does not have such blocks with the resultant irregularly arranged increased number of slots.

However, such an increased number of slots formed on each valve member is translated into an increased production cost, a larger diameter valve member, and thus a large dimension device. Furthermore, since the introduction of such blocks makes it difficult to form the slots regularly, the circumferential arrangement of the throttling portions is irregular, so that unbalanced hydraulic pressure acts on the first and second valve members. This causes the second valve member to be pressed against the first valve member, so that a malfunction results.

Furthermore, in the above-mentioned conventional rotary control valve, the flow rate of oil passing through the throttling portions is large, so that high-level sounds are produced as a result of the oil flow.

Furthermore, the above-mentioned conventional hydraulic power steering device is occasionally unable to provide steering assist force responsive to steering resistance at medium driving speeds. To be more precise, in FIG. 22, a solid line P represents the total flow area of the first group throttling portions A, D or B, C versus the angle of relative rotation in one direction between the two valve members. Although the flow area of each of the throttling portions increases as the angle of relative rotation in the other direction increases, the throttling portions do not throttle oil any more if flow area exceeds the value at zero angle of rotation. Therefore, in this specification, the "total flow area" means the total value of throttling portions for which the total flow area decreases as the angle of relative rotation increases. In this case, the total flow area under right turn steering conditions is the total value of throttling portions B, C, and the total flow area under left turn steering conditions is the total value of throttling portions A, D. In FIG. 22, an alternate long and short dash line Q represents the total flow area of the second group throttling portions A', D' or B', C' versus the angle of relative rotation in one direction (in this case, the total flow area under right turn steering conditions is the total value of the throttling portions B', C' and the total flow area under left turn steering conditions is the total value of the throttling portions A', D'). A dotted line R represents the flow area of the variable throttle valve 502. The flow area of the variable throttle valve 502 varies depending on the vehicle's driving speed.

Under low driving speed conditions, since the variable throttle valve 502 is fully closed, hydraulic pressure acting on the hydraulic cylinder 503 is controlled by only the first group throttling portions A, B, C, D. Therefore, steering assist force is provided in response to the variation characteristic of the total flow area of the first group throttling portions A, D or B, C as shown by the solid line P according to steering resistance.

Under high driving speed conditions, the flow area of the variable throttle valve 502 becomes greater than the maximum value S of the total flow area of the second group throttling portions A', D' or B', C' (in this specification, the "maximum value" means a maximum value in the variation characteristic of the total flow area wherein the total flow area decreases as the relative angle of rotation increases). Therefore, steering assist force is provided in response to the combined characteristics of the variation characteristic of the total flow area of the second group throttling portions A', D' or B', C', as shown by the alternate long and short dash line Q, and the variation characteristic of the total flow area of the first group throttling portions A, D or B, C as shown by the solid line P.

However, under medium driving speed conditions, as shown by the dotted line R in FIG. 22, the flow area of the variable throttle valve 502 is greater than zero and smaller than the maximum value S of the total flow area of the second group throttling portions A', D' or B', C'. Thus, steering assist force is provided in response to the combined characteristics of the variation characteristic of the total flow area of the first group throttling portions A, D or B, C as shown by the solid line P and the flow area of the variable throttle valve 502 as shown by the dotted line R, until the first group throttling portions A, D or B, C reach their fully closed position (where the angle of relative rotation is $\theta 1$ in FIG. 22). After the first group throttling portions A, D or B, C reach a fully closed position and before the total flow area of the second group throttling portions A', D' or B', C' gets smaller than the flow area of the variable throttle value 502 (namely, in the angular region between $\theta 1$ and $\theta 2$ in FIG. 22), steering assist force remains a constant value determined by the flow area of the variable throttle valve 502 and remains unvaried, even if the angle of relative rotation varies. Each of FIG. 6 and FIG. 13 shows the relationship between input torque for steering operation and hydraulic pressure acting on a hydraulic actuator for generating steering assist force and the relationship between the angle of relative rotation and the hydraulic pressure. As shown by a two-dot chain line in each of the figures, there is a certain range L where hydraulic pressure acting on the hydraulic actuator remains unvaried regardless of variation of the input torque and angle of relative rotation. In the range L, the steering assist force cannot be controlled in response to steering resistance. Therefore, in the event that the range L is wide, smooth steering feel can not be obtained. This problem becomes more apparent when the difference between the point where the rate of increase of steering assist force sharply rises at high driving speeds (corresponding to the point where the slope of the solid line sharply increases in FIG. 6 and FIG. 13) and the point where the rate of increase of steering assist force sharply rises at low driving speeds (corresponding to the point where the slope of the alternate long and short dash line sharply increases in FIG. 6 and FIG. 13) becomes large. Namely, the problem becomes more apparent when the medium speed range is expanded. This makes it difficult to distinguish the difference between steering feel at high driving speeds and steering feel at low driving speeds, so that proper steering feel corresponding to vehicle speed can not be obtained.

A method may be desired that results in the narrowing of the range where steering assist force cannot be controlled in response to steering resistance at medium driving speeds. In other words, such a method would narrow the difference between the angle point $\theta 1$ where the first group throttling portions A, D or B, C are fully closed and the angle point $\theta 2$ where the total flow area of the second group throttling portions A', D' or B', C' gets smaller than the flow area of the variable throttle valve 502 by reducing the difference between the angle point $\theta 1$ and the angle point $\theta 3$ where the second group throttling portions A', D' or B', C' are fully closed, as shown in FIG. 22. However, when the difference between the angle point $\theta 1$ and $\theta 3$ becomes small, the range over which steering resistance can be controlled becomes narrow, so that steering feel becomes poor.

The object of the present invention is to solve the above problems.

SUMMARY OF THE INVENTION

The hydraulic power steering device according to the present invention has a hydraulic actuator for generating steering assist force and a hydraulic control valve; the hydraulic control valve comprising a cylindrical first valve member and a second valve member which is inserted in the first valve member so as to be rotatable relative to the first valve member in accordance with steering resistance; wherein a plurality of throttling portions are formed between the inner circumference of the first valve member and the outer circumference of the second valve member, the flow area of each of the throttling portions varies in response to the angle of relative rotation between the first valve member and second valve member, and each throttling portion is disposed in an oil flow path via which a pump, a tank and the hydraulic actuator communicate with each other so as to generate steering assist force in response to a direction of steer and steering resistance.

According to the first aspect of the present invention, a plurality of slots circumferentially spaced from each other are formed on the inner circumference of the first valve member. A plurality of slots circumferentially spaced from each other are formed on the outer circumference of the second valve member. Spaces between axially extending edges defined by the slots of the first valve member and axially extending edges defined by the slots of the second valve member constitute throttling portions. The slots comprise at least two hydraulic oil feed slots connected to the pump, first and second hydraulic oil outlet slots connected to the tank, a right turn slot connected to a right turn steering assist oil chamber of the hydraulic actuator, a left turn slot connected to a left turn steering assist oil chamber of the hydraulic actuator, and at least two communication slots. The first hydraulic oil outlet slot is located between the right turn slot and the left turn slot. The second hydraulic oil outlet slot is located between the two communication slots. The hydraulic oil feed slots are located between the right turn slot and the communication slot and between the left turn slot and the communication slot. The throttling portion between the right turn slot and the hydraulic oil feed slot, the throttling portion between the right turn slot and the first hydraulic oil outlet slot, the throttling portion between the left turn slot and the hydraulic oil feed slot, and the throttling portion between the left turn slot and the first hydraulic oil outlet slot belong to a first group. The throttling portions between the communication slots and the hydraulic oil feed slot, and the throttling portions between the communication slots and the second hydraulic oil outlet slot belong to a second group. The throttling portions belonging to the second group are divided into two types, of which one is disposed between the communication slots and the hydraulic oil feed slot and another one is disposed between the communication slots and the second hydraulic oil outlet slot. The closing angle of each of at least one type of the second group throttling portions is set larger than the closing angle of each of the first group throttling portions. A variable throttle valve, capable of varying the flow area of its own throttling portion in response to driving conditions, is disposed in an oil flow path connecting the second group throttling portions to the tank.

In a hydraulic power steering device according to the first aspect of the present invention, since all of the throttling portions disposed between the first valve member and the second valve member are opened under steering conditions that do not require a right or left turn, hydraulic oil fed to the control valve from the pump circulates back to the tank, so that no steering assist force is generated.

When steering resistance resulting from right turn steering operation causes a relative rotation in one direction between the first valve member and the second valve member, the flow area of each of the throttling portions between the hydraulic oil feed slot and the right turn slot, and the flow area of each of the throttling portions between the hydraulic oil feed slot next to the left turn slot and the communication slot are increased. The flow area of each of the throttling portions between the right turn slot and the first hydraulic oil outlet slot, and the flow area of each of the throttling portions between the communication slot next to the hydraulic oil feed slot next to the left turn slot and the second hydraulic oil outlet slot are decreased. The flow area of each of the throttling portions between the hydraulic oil feed slot and the left turn slot, and the flow area of each of the throttling portions between the hydraulic oil feed slot next to the right turn slot and the communication slot are decreased, and the flow area of each of the throttling portions between the left turn slot and the first hydraulic oil outlet slot, and the flow area of each of the throttling portions between the communicating slot next to the hydraulic oil feed slot next to the right turn slot and the second hydraulic oil outlet slot are increased. As a result, hydraulic pressure in response to the direction of steer and steering resistance is applied to the right turn steering assist oil chamber of the hydraulic actuator, and hydraulic oil is circulated back from the left turn steering assist oil chamber to the tank, so that steering assist force is generated to steer a vehicle to the right.

When a relative rotation in the other direction between the first valve member and the second valve member is caused by left turn steering operation, the flow area of each of the throttling portions disposed between the first valve member and the second valve member varies oppositely from the case with the right turn steering operation, so that steering assist force is generated to steer the vehicle to the left.

For example, in the event that the vehicle's speed is high or the angle of steer is small, the flow area of the variable throttle valve's own throttling portion can be set greater than the maximum value of the total flow area of the second group throttling portions, or can be opened until the throttle valve no longer throttles oil. The "maximum value of the total flow area" means a maximum value in the variation characteristic of the total flow area wherein the total flow area decreases as the relative angle of rotation increases. In the embodiments described below, in right turn steering condition the maximum value means the maximum value of the total flow area of throttling portions B' and C', while in left turn steering condition it means the maximum value of the total flow area of throttling portions A' and D'. This definition of the "maximum value of the total flow area" is applicable throughout this specification. In this case, hydraulic pressure acting on the hydraulic actuator is controlled in response to both of the variation characteristic of the total flow area of the first group throttling portions and the variation characteristic of the total flow area of the second group throttling portions. Therefore, unless the angle of relative rotation between the two valve members is increased by increasing input torque for steering operation, the total flow area of the second group throttling portions is kept large. Therefore, the rate of increase of hydraulic pressure for generating steering assist force remains small, so that a stable response characteristic in steering operation at high driving speed can be achieved.

As another example, in the event that the vehicle's speed is low or the angle of steer is large, the flow area of the variable throttle valve's own throttling portion can be set smaller than the minimum value of the total flow area of the second group throttling portions. The "minimum value of the total flow area" means a minimum value in the variation characteristic of the total flow area wherein the total flow area decreases as the angle of relative rotation increases. In the embodiments described below, under right turn steering conditions, the minimum value of the total flow area means the minimum value of the total flow area of throttling portions B' and C'. Under left turn steering conditions it means the minimum value of the total flow area of throttling portions A' and D'. Each throttling portion may be fully closed when its flow area is minimum. This definition of the "minimum value of the total flow area" is applicable throughout this specification. In this case, hydraulic pressure acting on the hydraulic actuator can be controlled in response to only the variation characteristic of the total flow area of the first group throttling portions. Thus, even if input torque for steering operation and angle of relative rotation between the two valve members is small, the total flow area of the throttling portions where pressure oil flows toward the tank becomes small. This increases the rate of increase of hydraulic pressure for generating steering assist force, so that fast response characteristic in steering operation at low steering speed can be achieved.

In the hydraulic power steering device according to the first aspect of the present invention, the variable throttle valve, capable of varying its own flow area in response to driving conditions such as vehicle's speed, is disposed in the oil flow path between the second group throttling portions and the tank, so that the difference between hydraulic pressure in the oil flow path where the first group throttling portions are disposed and the hydraulic pressure in the oil flow path where the second group throttling portions are disposed is not increased. Therefore, a cross-sectional elliptical deformation of the first valve member and the second valve member is prevented. Furthermore, the acceptable minimum number of slots formed on each of the first and second valve members is as small as four. A block for interrupting communication between the first group throttling portions and the second group throttling portions is not needed. Furthermore, it is not necessary for the first group throttling portions to be axially spaced from the second group throttling portions. These advantages contribute to the prevention of malfunction of the device, reduction in manufacturing costs, and compact design in radial and axial dimensions.

The number of slots formed on each of the valve members can be eight, in which the four hydraulic oil feed slots are mutually equally spaced, the two left turn slots are mutually equally spaced, the two right turn slots are mutually equally spaced, and the hydraulic oil feed slots are adjacent the left turn slots and the right turn slots. This arrangement allows hydraulic pressure for generating steering assist force to act on the first and second valve members from circumferentially equally spaced points. Therefore, the second valve member is prevented from being pressed against the first valve member by unbalanced hydraulic pressure.

In the first aspect of the present invention, the closing angle of each of the second group throttling portions can be set larger than the closing angle of each of the first group throttling portions, and the closing angle of each of one type of the second group throttling portions can be different from the closing angle of each of another type of the second group throttling portions. This latter arrangement offers a second aspect of the present invention. Thus, improved steering feel results and sound caused by flowing oil is reduced as detailed later.

The number of slots formed on each of the valve members can be twelve, in which the six hydraulic oil feed slots are mutually equally spaced, the three left turn slots are mutually equally spaced, the three right turn slots are mutually equally spaced, and the hydraulic oil feed slots are adjacent the left turn slots and the right turn slots. This arrangement allows the hydraulic pressure for generating steering assist force to act on the first and second valve members from circumferentially equally spaced three points. Therefore, the second valve member is prevented from being pressed against the first valve member by unbalanced hydraulic pressure, although the number of slots is not less than that of the conventional device. Furthermore, a cross-sectional deformation of the first valve member and the second valve member is prevented. Furthermore, sound produced by oil flow is restricted, because the larger number of slots results in a lower flow rate of oil passing through each throttling portion.

The second aspect of the present invention is characterized in that the throttling portions are grouped into a first group and a second group. The throttling portions belonging to the second group are divided into two types, with the closing angle of each of one type of the second group throttling portions being different from the closing angle of each of another type of the second group throttling portions. The closing angle of each of the second group throttling portions is set larger than the closing angle of each of the first group throttling portions. A variable throttle valve, capable of varying the flow area of its own throttling portion in response to driving conditions, is disposed in an oil flow path connecting the second group throttling portions to the tank.

According to the second aspect of the present invention, since the second group consists of the two types of throttling portions of which one type is different from the other type in closing angle, the variation characteristic of the total flow area of one type of the throttling portions is different from the variation characteristic of the total flow area of another type of the throttling portions versus the angle of relative rotation between the two valve members. Therefore, the rate of variation of the total flow area of the second group throttling portions versus the angle of relative rotation is determined by the combined characteristics of the variation characteristic of the total flow area of one type of the throttling portions and the variation characteristic of the total flow area of another type of the throttling portions.

Therefore, in the event that the vehicle's speed is at medium speed, the difference between the point where the total flow area of the first group throttling portions is minimum and the point where the total flow area of the second group throttling portions gels smaller than the flow area of the variable throttle valve (corresponding to the difference between $\theta a$ and $\theta b$ in FIG. 7 and FIG. 14 as described later) can be narrowed without narrowing the difference between the point where the total flow area of the first group throttling portions is minimum and the point where the total flow area of the second group throttling portions is minimum (corresponding to the difference between $\theta a$ and $\theta c$ in FIG. 7 and FIG. 14 as described later). In other words, without narrowing the range over which steering assist force can be controlled in response to steering resistance, the range where steering assist force cannot be controlled in response to steering resistance can be narrowed. This helps improve steering feel. Furthermore, the closing angle of each of one type of the second group throttling portions is different from the closing angle of each of another type of the second group throttling portions, so that the rate of variation of the flow rate of hydraulic oil is gradual as compared to the rate of variation of the flow rate for a second group throttling portions that is of uniform type flow can be lowered.

DETAILED DESCRIPTION OF THE PREFERRED EMBODIMENTS

Embodiment 1

Referring to FIG. 1 through FIG. 7, the first embodiment is discussed.

Figure 1:
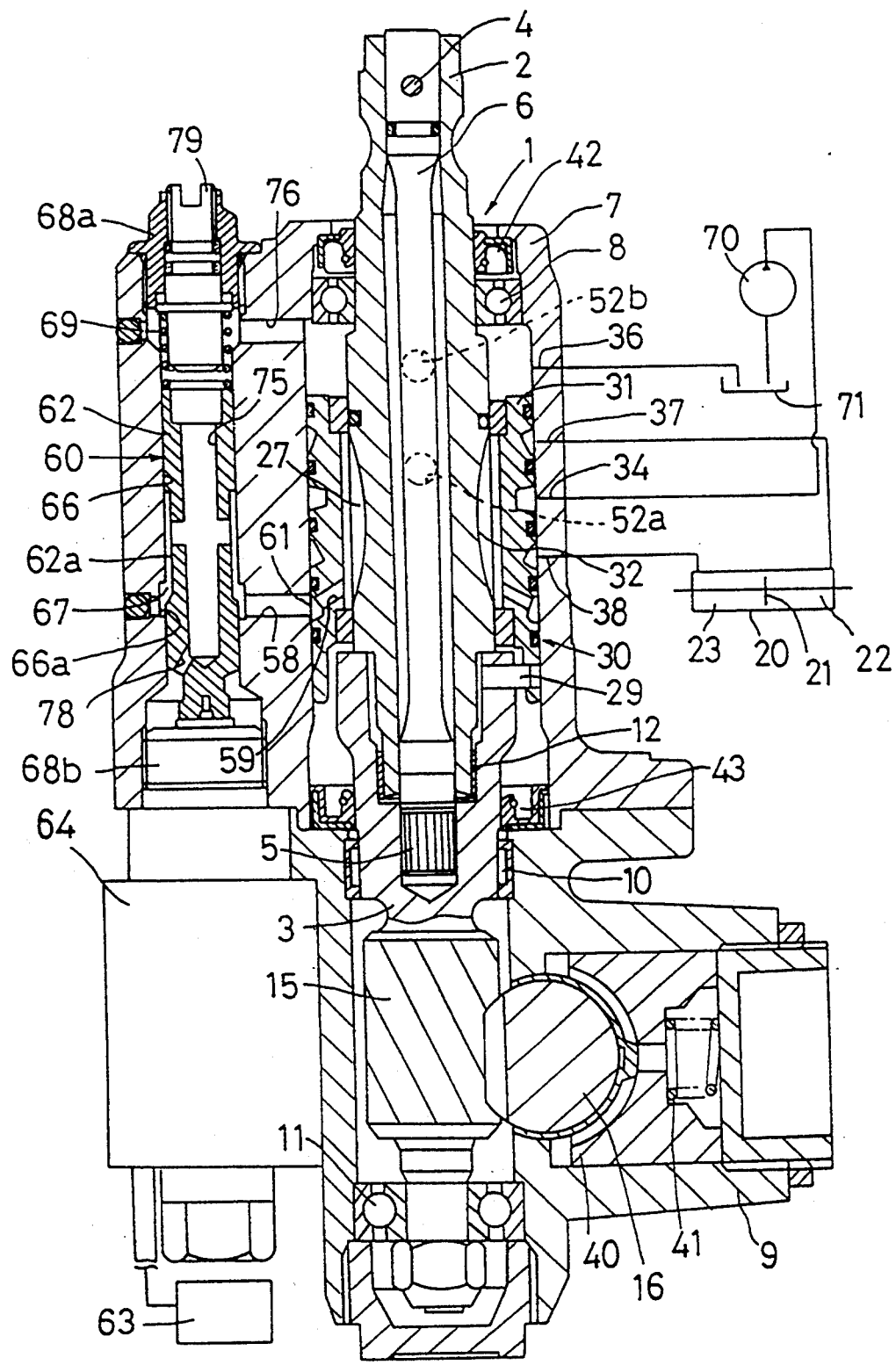
FIG. 1 is a vertical cross-sectional view of a first embodiment of the hydraulic power steering device according to the present invention.
Figure 2:
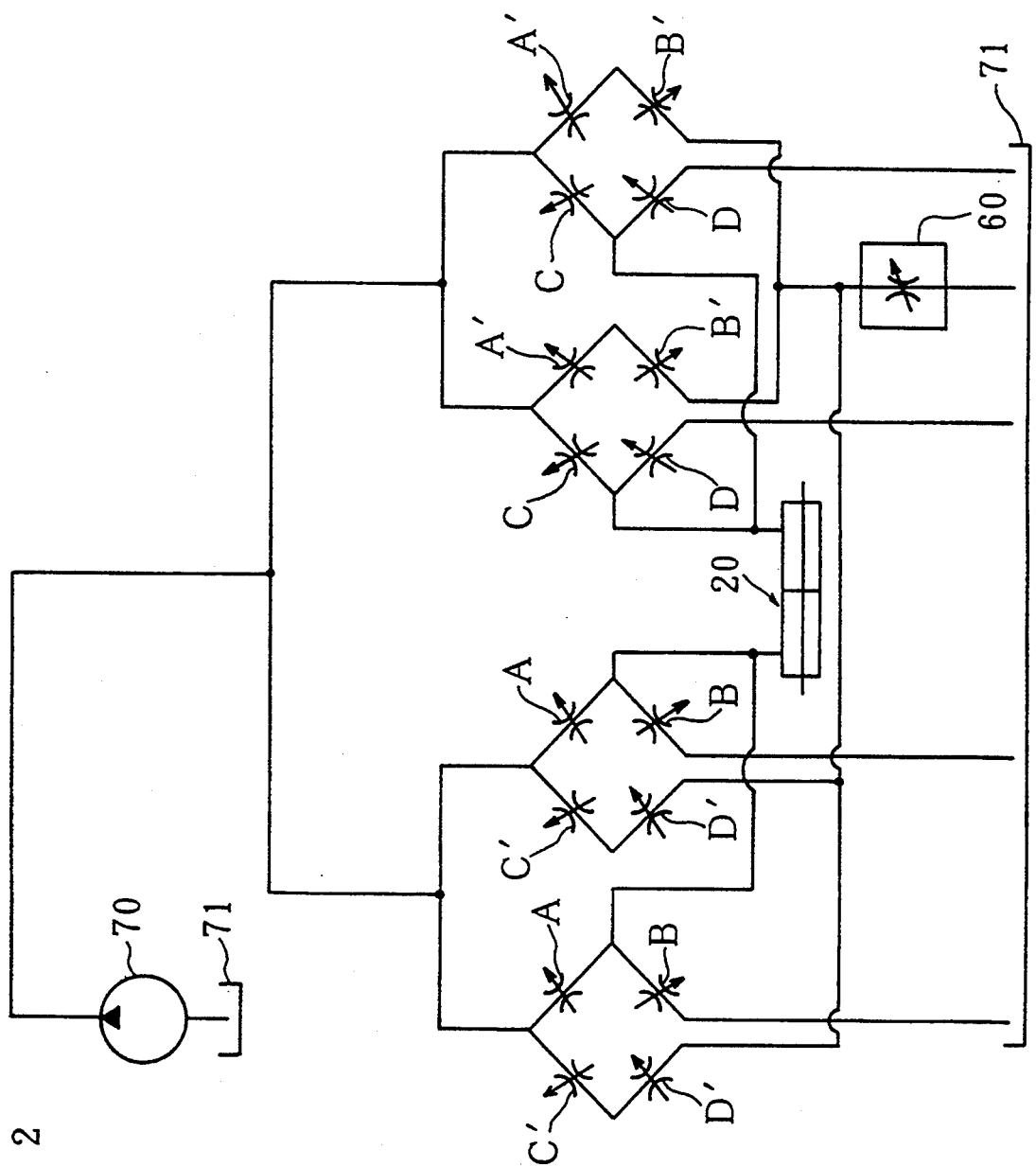
FIG. 2 shows a hydraulic circuit of the first embodiment of the hydraulic power steering device according to the present invention.

A rack and pinion gear type hydraulic power steering device 1 shown in FIG. 1 comprises an input shaft 2 connected to the steering wheel (not shown) of a vehicle, and an output shaft 3 connected to the input shaft 2 via a torsion bar 6. The torsion bar 6 is connected to the input shaft 2 by a pin 4 and connected to the output shaft 3 by its serration portion 5. The input shaft 2 is supported by a valve housing 7 via a bearing 8, and also supported by the output shaft 3 via a bearing 8, and also supported by the output shaft 3 via a bearing 12. The output shaft 3 is supported by a rack housing 9 via bearings 10, 11. The output shaft 3 has a pinion portion 15, which is meshed with a rack 16 linked to a vehicle's wheels (not shown). The rotation of the input shaft 2 by steering operation is transmitted to the pinion 15 via the torsion bar 6. The rotation of the pinion 15 moves the rack 16 in the transverse direction of the vehicle, and the movement of the rack 16 causes the vehicle to be steered. Oil seals 42, 43 are disposed between the input shaft 2 and the housing 7 and between the output shaft 3 and the housing 7. A support yoke 40 which supports the rack 16 is urged against the rack 16 by a spring 41.

A hydraulic cylinder 20 is provided as a hydraulic actuator for generating steering assist force. The hydraulic cylinder 20 comprises a cylinder formed of the rack housing 9 and a piston 21 integrally formed with the rack 16. A rotary type hydraulic control valve 30 is provided to feed oil to oil chambers 22, 23, which are partitioned by the piston 21 so that one oil chamber 22 serves for generating right turn steering assist force and the other oil chamber 23 serves for generating left turn steering assist force according to the direction of steer and steering resistance.

The control valve 30 comprises a cylindrical first valve member 31 which is rotatably inserted in the valve housing 7, and a second valve member 32 which is inserted in the first valve member 31 so as to be coaxial and rotatable relative to the first valve member 31. The first valve member 31 is connected to the output shaft 3 via a pin 29 so as to be rotatable together with the output shaft 3. The second valve member 32 is integrally formed with the input shaft 2. Namely, the second valve member 32 is formed of the outer circumference of the input shaft 2, and thus the second valve member 32 is rotatable together with the input shaft 2. Therefore, twisting of the torsion bar 6 causes a coaxial relative rotation between the first valve member 31 and the second valve member 32.

An inlet port 34 connected to a pump 70, a first port 37 connected to one oil chamber 22 of the hydraulic cylinder 20, a second port 38 connected to the other oil chamber 23 of the hydraulic cylinder 20, a first outlet port 36 directly connected to a tank 71, and a second outlet port 61 connected to the tank 71 via a variable throttle valve 60 described later are formed on the valve housing 7. The ports 34, 36, 37, 38, 61 mutually communicate with each other via an oil flow path 27 between the inner circumference of the first valve member 31 and the outer circumference of the second valve member 32.

Figure 3:
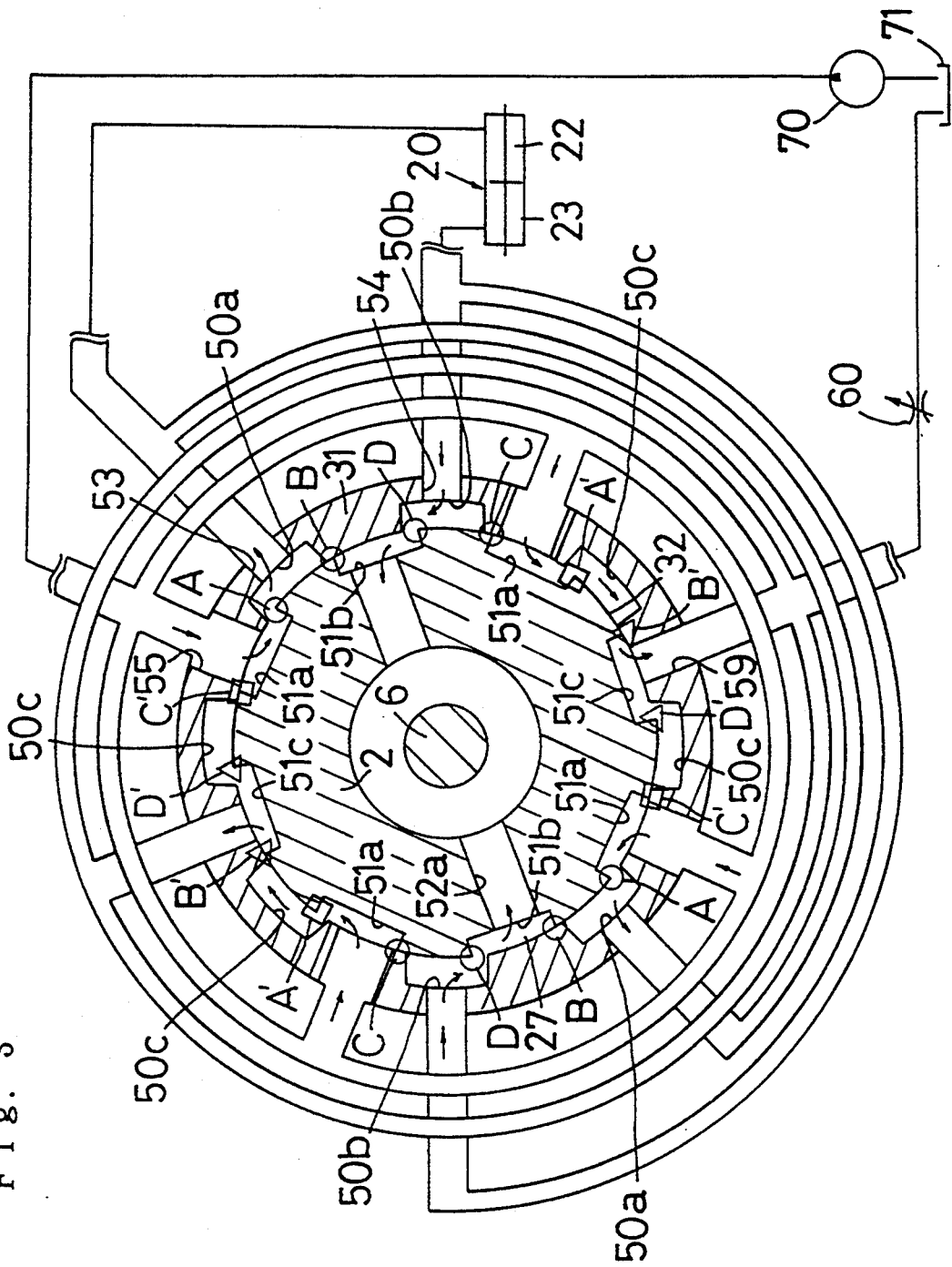
FIG. 3 illustrates the cross-sectional structure of the control valve according to the first embodiment of the present invention.
Figure 4:
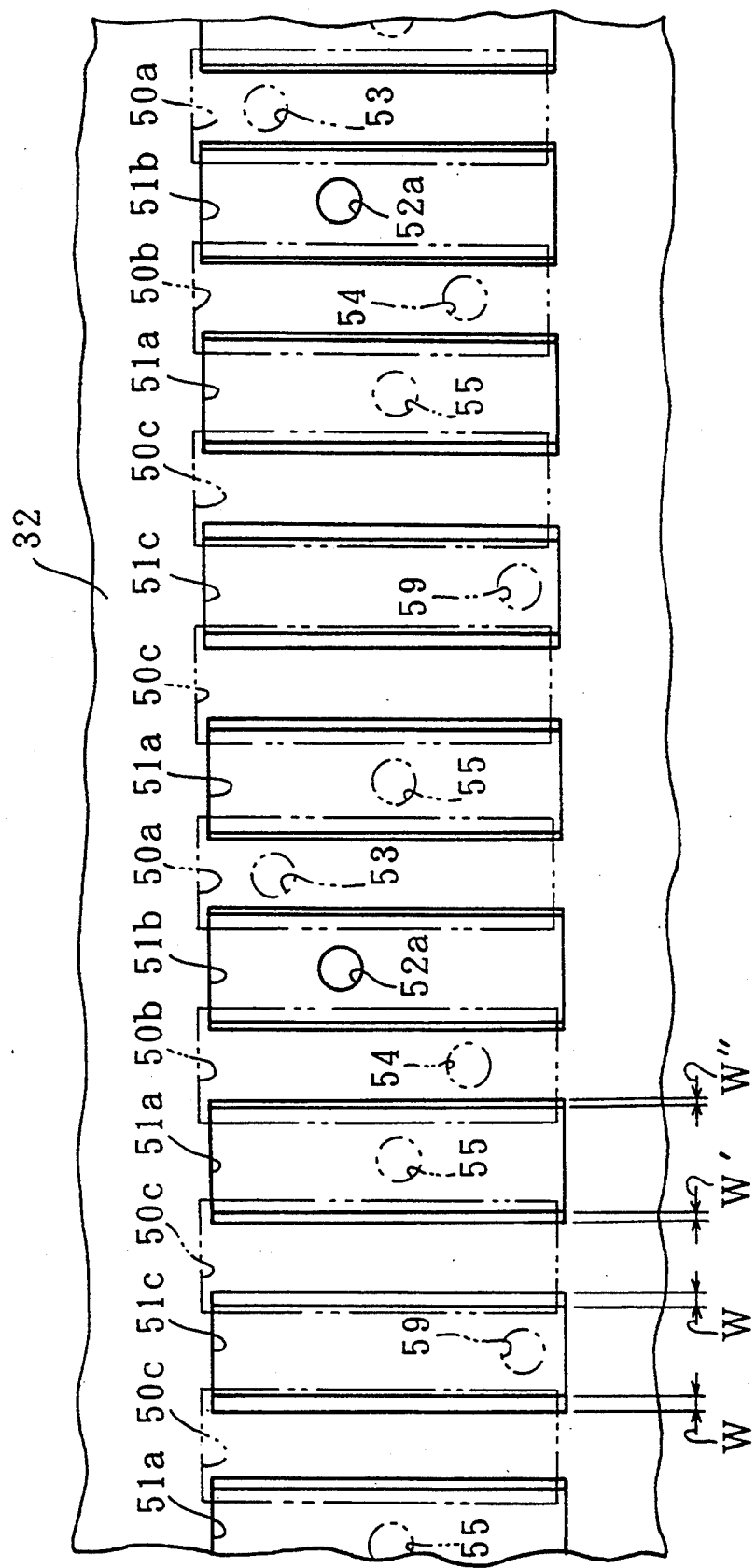
FIG. 4 is a development of the control valve according to the first embodiment of the present invention.

As shown in FIG. 3 and FIG. 4, eight slots 50a, 50b and 50c are circumferentially equally spaced to each other and are formed on the inner circumference of the first valve member 31. Eight slots 51a, 51b and 51c are circumferentially equally spaced to each other and are formed on the outer circumference of the second valve member 32. In FIG. 4, solid lines show a development of the second valve member 32, and chain lines show slots 50a, 50b, 50c formed on the first valve member 31. The slots 50a, 50b, 50c formed on the first valve member 31 alternate with the slots 51a, 51b, 51c formed on the second valve member 32.

The slots of the first valve member 31 consist of two right turn slots 50a, two left turn slots 50b, and four communication slots 50c. The two right turn slots 50a, which are angularly spaced by 180° to each other, are connected to the right turn steering assist oil chamber 22 of the hydraulic cylinder 20 via flow paths 53 formed in the first valve member 31 and the first port 37. The two left turn slots 50b, which are angularly spaced by 180° to each other, are connected to the left turn steering assist oil chamber 23 of the hydraulic cylinder 20 via flow paths 54 formed in the first valve member 31 and the second port 38.

The slots formed on the second valve member 32 consist of four hydraulic oil feed slots 51a, two first hydraulic oil outlet slots 51b, and two second hydraulic oil outlet slots 51c. The four hydraulic oil feed slots 51a, which are spaced by 90° to each other, are connected to the pump 70 via oil inlet paths 55 formed in the first valve member 31 and the inlet port 34. The two first hydraulic oil outlet slots 51b, which are angularly spaced by 180° to each other, are connected to the tank 71 via oil flow paths 52a formed in the input shaft 2, the space between the input shaft 2 and the torsion bar 6, oil flow paths 52b (see FIG. 1) formed in the input shaft 2, and the first outlet port 36. The two second hydraulic oil outlet slots 51c, which are angularly spaced by 180° to each other, are connected to a variable throttle valve 60 via oil flow paths 59 formed in the first valve member 31 and the second outlet port 61.

Each first hydraulic oil outlet slot 51b is located between the right turn slot 50a and the left turn slot 50b, each second hydraulic oil outlet slot 51c is located between the communication slots 50c. Two of the hydraulic oil feed slots 51a are respectively located between the right turn slot 50a and the communication slot 50c, and another two of the hydraulic oil feed slots 51a are respectively located between the left turn slot 50b and the communication slot 50c.

Spaces between axially extending edges defined by the slots 50a, 50b, 50c of the first valve member 31 and the axially extending edges defined by the slots of 51a, 51b, 51c of the second valve member 32 constitute throttling portions A, A', B, B', C, C', D, D'. The throttling portions A, A', B, B', C, C', D, D' are thus disposed in the oil flow path 27 via which the pump 70, the tank 71 and the hydraulic cylinder 20 communicate with each other.

Figure 5:
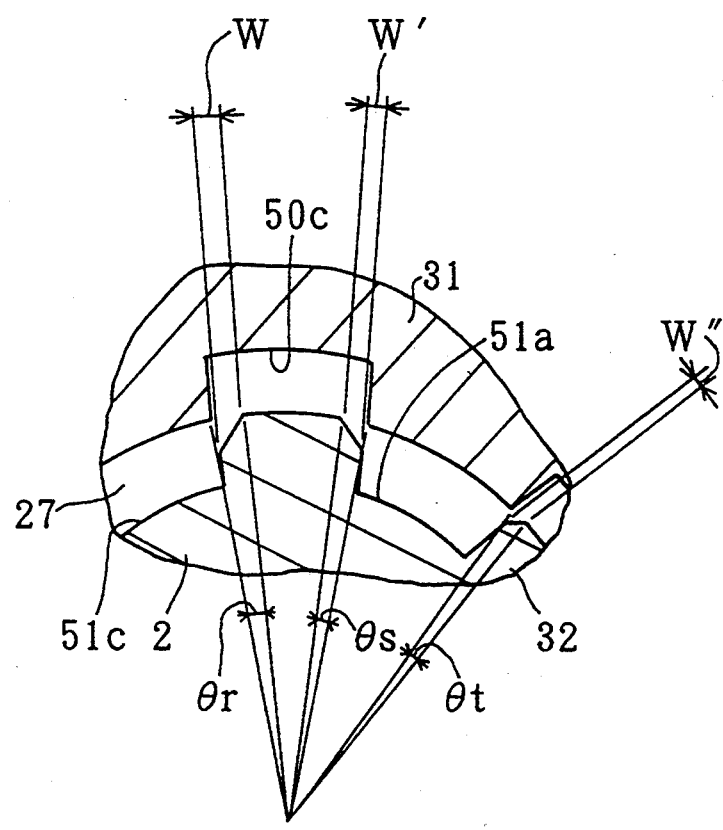
FIG. 5 is an enlarged view of the essential portion of the control valve according to the first embodiment of the present invention.
Figure 6:
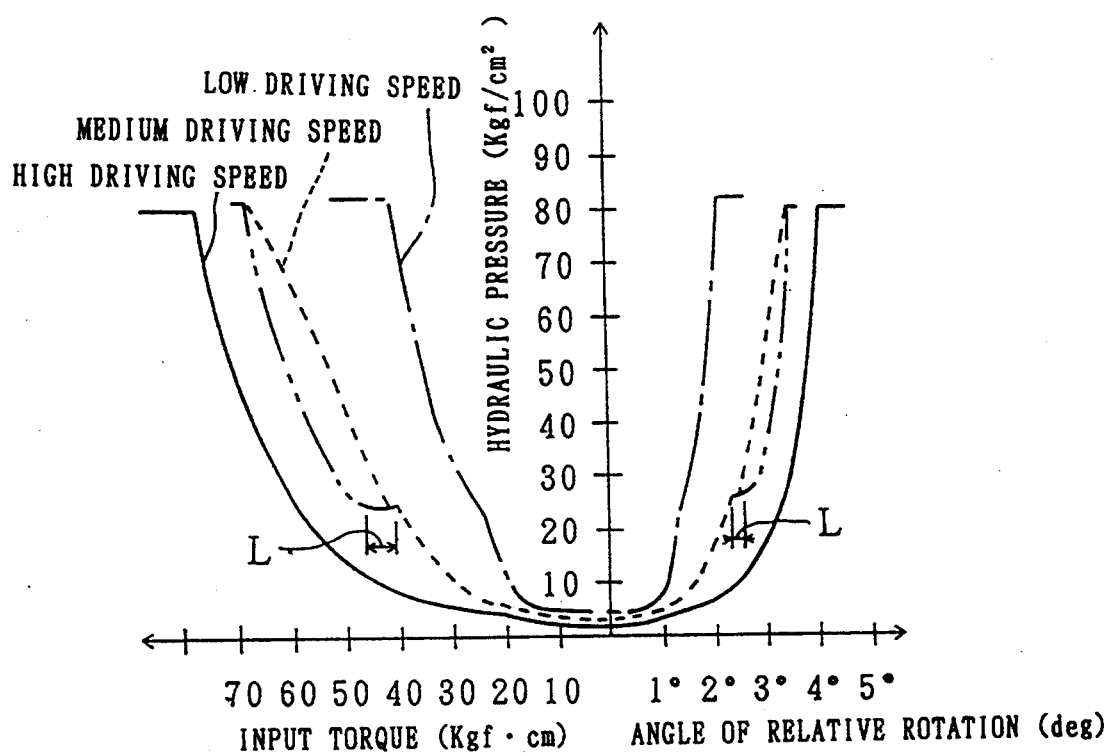
FIG. 6 show the relationship between input torque for steering operation and hydraulic pressure and the relationship between the angle of relative rotation between the two valve members and hydraulic pressure, in the hydraulic power steering device according to the first embodiment of the present invention.

The axially extending edges defined by the slots 51a, 51b, 51c formed on the second valve member 32 are chamfered as shown in FIG. 5. It is assumed that W is the width of each of the chamfer areas along the axially extending edges (marked by Δ in FIG. 3) defined by the second hydraulic oil outlet slots 51c at the throttling portions B', D' between the communication slots 50c and the second hydraulic oil outlet slots 51c. It is assumed that W' is the width of each of the chamfer areas along the axially extending edges (marked by □ in FIG. 3) defined by the hydraulic oil feed slots 51a at the throttling portions A', C' between the hydraulic oil feed slots 51a and the communication slots 50c. It is assumed that W''' is the width of each of the chamfer areas along the axially extending edges (marked by ○ in FIG. 3) defined by the remaining slots formed on the second valve member 32. The widths W, W' W''', are related with each other as W>W'>W''' as shown in FIG. 4 and FIG. 5. The angle of relative rotation between the two valve members 31, 32 required to fully close each of the throttling portions A, A', B, B', C, C', D, D' in the state of no steering resistance (in the state of FIG. 4 and FIG. 5), i.e., the closing angle, is related as follows: the closing angle $\theta r$ of each of the throttling portions B', D' between the communication slots 50c and the second hydraulic oil outlet slots 51c is greater than the closing angle $\theta s$ of each of the throttling portions A', C' between the hydraulic oil feed slots 51a and the communication slots 50c; and both closing angles $\theta r$ and $\theta s$ are respectively greater than the closing angle $\theta t$ of each of the remaining throttling portions A, B, C, D. The throttling portions between the first valve members and the second valve members are grouped into a first group of throttling portions A, B, C, D and a second group of throttling portions A', B', C', D' wherein the closing angle $\theta r$, $\theta s$ of each of the second group throttling portions is larger than that $\theta t$ of each of the first group throttling portions is larger than that $\theta t$ of each of the first group throttling portions. The second group throttling portions are divided into two types. The second group throttling portions A', C' between the hydraulic oil feed slots 51a and the communication slots 50c belong to one type and the second group throttling portions B', D' between the communication slots 50c and the second hydraulic oil outlet slots 51c belong to another type, wherein closing angle $\theta s$ of each of one type of the throttling portions A', C' is smaller than closing angle $\theta r$ of each of another type of the throttling portions B', D'.

Twist of the torsion bar 6 causes relative rotation between the input shaft 2 and the output shaft 3 in response to steering resistance which is transmitted from road surfaces to the vehicle's wheels. The relative rotation between the input shaft 2 and the output shaft 3 causes a relative rotation between the first valve member 31 and the second valve member 32, so that the flow area of each of the throttling portions A, B, C, D, A', B', C', D' varies and consequently the hydraulic cylinder 20 generates steering assist force according to the steering resistance and the direction of steer.

FIG. 4 illustrates the state of no steering operation in which the throttling portions A, B, C, D, A', B', C', D' between the both valve members 31, 32 are all opened and the inlet port 34 communicates with the outlet ports 36, 61 via the oil flow path 27 between both valve members 31, 32. In this state, hydraulic oil fed into the control valve 30 by the pump 70 is circulated back to the tank 71, so that no steering assist force generates.

When steering resistance resulting from right turn steering operation causes a relative rotation in one direction between valve members 31 and 32, as shown in FIG. 3, the flow area of each of the throttling portions A between the hydraulic oil feed slots 51a and the right turn slots 50a and the flow area of each of the throttling portions A' between the hydraulic oil feed slots 51a next to the left turn slots 50b and the communication slots 50c is increased, the flow area of each of the throttling portions B between the right turn slots 50a and the first hydraulic oil outlet slots 51b and the flow area of each of the throttling portions B' between the communication slots 51c next to the hydraulic oil feed slots 51a next to the left turn slots 50b and the second hydraulic oil outlet slots 51c is decreased, the flow area of each of the throttling portions C between the hydraulic oil feed slots 51a and the left turn slots 50b and the flow area of each of the throttling portions C' between the hydraulic oil feed slots 51a next to the right turn slots 50a and the communication slots 50c is decreased, and the flow area of each of the throttling portions D between the left turn slots 50b and the first hydraulic oil outlet slots 51b and the flow area of each of the throttling portions D' between the communication slots 50c next to the hydraulic oil feed slots 51a next to the right turn slots 50a and the second hydraulic oil outlet slots 51c is increased. As a result, by oil flow as shown in arrows in FIG. 3, hydraulic pressure in response to the steering resistance and direction of steer is applied to the right turn steering assist oil chamber 22 of the hydraulic cylinder 20 and hydraulic oil is circulated back to the tank 71 from the left turn steering assist oil chamber 23, so that steering assist force to steer toward the right of the vehicle is transmitted to the rack 16 from the hydraulic cylinder 20.

When a relative rotation in the other direction between the first valve member 31 and the second valve member 32 is caused by left turn steering operation, since the flow area of each of the throttling portions A, A' is decreased, the flow area of each of the throttling portions B, B' is increased, the flow area of each of the throttling portions C, C' is increased, and the flow area of each of the throttling portions D, D' is decreased, steering assist force to steer toward the left of the vehicle is transmitted to the rack 16 from the hydraulic actuator 20.

As shown in FIG. 1, the variable throttle valve 60 which communicates with the second outlet port 61 comprises a spool 62, which is inserted in a hole 66 formed in a valve housing 7 so as to be vertically movable in the figure. The hole 66 is sealed at one end with a plug 68a and at the other end with a plug 68b. A compression coiled spring 69 is held between a spring force adjusting screw 79 screwed the plug 68a and the top of the spool 62. A solenoid 64 which applies electromagnetic force to the spool 62 and a controller 63 which has a speed sensor is provided to control the electromagnetic force provided by the solenoid 64 according to vehicle's speed. In this arrangement, in high driving speed condition, the electromagnetic force is reduced and the spool 62 is displaced downward in the FIG. 1, while in low driving speed condition, the electromagnetic force is increased and the spool 62 is displaced upward in the FIG. 1.

A circular groove 62a is formed on the outer circumference of the spool 62 and a circular groove 66a is formed on the inner circumference of the hole 66. A space between both circular grooves 62a, 66a constitutes a throttling portion 67 of the variable throttle valve 60. The flow area of the throttling portion 67 increases as the spool 62 is displaced downward in FIG. 1 at high driving speeds and decreases as the spool 62 is displaced upward in FIG. 1 at low driving speeds. The maximum value of the flow area of the throttling portion 67 is set greater than the maximum value of the total flow area of the second group throttling portions A', B', C', D', or the throttling portion 67 is opened until the throttle valve 60 no longer throttles oil. The minimum value of the flow area of the throttling portion 67 is set smaller than the minimum value of the total flow area of the second group throttling portions A', B', C', D'.

The valve housing 7 is provided with an oil flow path 58 via which the throttling portion 67 of the variable throttle valve 60 communicates with the second outlet port 61. The spool 62 is provided with a through hole 75 via which the throttling portion 67 communicates with the space above the spool 62. The valve housing 7 is provided with a flow path 76 via which the first outlet port 36 communicates with the space above the spool 62. This arrangement constitutes the hydraulic circuit shown in FIG. 2, wherein the flow area of the oil flow path between the tank 71 and the second group throttling portions A', B', C', D' varies by operation of the variable throttling valve 60 according to the vehicle's speed. The spool 62 is provided with a drain path 78 via which the space above the spool 62 communicates with the space below the spool 62.

Figure 7:
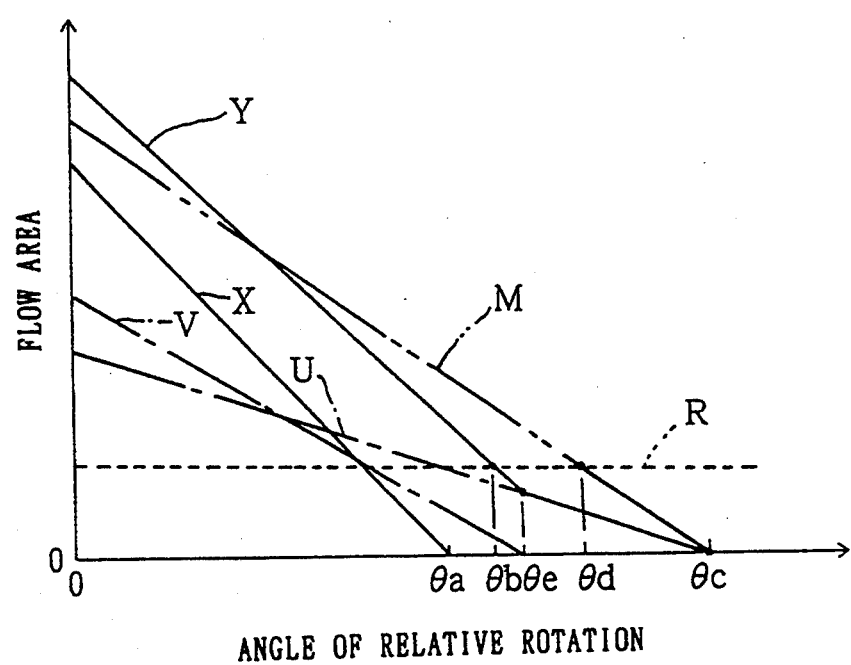
FIG. 7 shows the relationship between the flow area of the throttling portions of the control valve and the angle of relative rotation between the two valve members according to the first embodiment of the present invention.

In FIG. 7, a solid line X shows the variation characteristic of the total flow area of the first group throttling portions A, D or B, C versus the angle of relative rotation between the both valve members 31, 32. An alternative long and short dash line U shows the variation characteristic of the total flow area of the second group throttling portions B' or D' between the communication slots 50c and the second hydraulic oil outlet slots 51c versus the angle of relative rotation. An alternate long and short dash line V shows the variation characteristic of the total flow area of the second group throttling portions A' or C' between the hydraulic oil feed slots 51a and the communication slots 50c versus the angle of relative rotation. A solid line Y, which is the combination of the line U and line V, shows the variation characteristic of the total flow area of the second group throttling portions A', D' or B', C' versus the angle of relative rotation. The dotted line R shows the flow area set by the variable throttle valve 60's own throttling portion 67 at medium driving speed.

According to the above constitution, in low driving speed condition, the spool 62 is displaced upward in FIG. 1. This upward displacement of the spool 62 causes the throttling portion 67 of the variable throttle valve 60 to be fully closed, so that hydraulic pressure acting on the hydraulic cylinder 20 is controlled according to only the variation characteristic shown by the line X of the total flow area of the first group throttling portions A, D or B, C. Therefore, as shown by the alternate long and short dash line in FIG. 6, even when input torque for steering operation and angle of relative rotation between both valve members 31, 32 are small, the total flow area of the first group throttling portions A, D or B, C is reduced, and thus the rate of increase of hydraulic pressure for generating steering assist force is increased, so that fast response characteristic in steering operation at low driving speeds is achieved.

In high driving speed condition, the spool 62 is displaced downward in FIG. 1. This downward displacement of the spool 62 causes the flow area of the throttling portion 67 of the variable throttle valve 60 to increase beyond the maximum value of the total flow area of the second group throttling portions A', D' or B', C', so that the hydraulic pressure acting on the hydraulic cylinder 20 is controlled according to a combined characteristic, which is the combination of the variation characteristic of the total flow area of the second group throttling portions A', D' or B', C' shown by the line Y and the variation characteristic of the total flow area of the first group throttling portions A, D or B, C shown by the line X. Therefore, as shown by the solid line in FIG. 6, unless the angle of relative rotation between both valve members 31, 32 is increased by increasing input torque for steering operation, the total flow area of the second group throttling portions A', D' or B', C' is kept large without being decreased, and thus the rate of increase in hydraulic pressure for generating steering assist force remains small, so that stable steering response characteristic in steering operation at high driving speed is achieved.

In medium driving speed condition, the displacement of the spool 62 causes the flow area of the throttling portion 67 of the variable throttle valve 60 to be greater than the minimum value of the total flow area of the second group throttling portions A', D' or B', C' and smaller than the maximum value of the total flow area of the second group throttling portions A', D' or B', C'. Thereby, as shown by FIG. 7, in the angular range where the total flow area of the first group throttling portions A, D or B, C is larger than the minimum value (i.e., before the first group throttling portions reach the fully closed position in this embodiment, namely in the angular range where the angle of relative rotation between the two valve members is below θa in FIG. 7), steering assist force generates in response to the combined characteristic, which is the combination of the line X representing the variation characteristic of the total flow area of the first group throttling portions A, D or B, C and the line R representing the variation characteristic of the flow area of the throttling portion 67. In the angular range between the point where the first group throttling portions A, D or B, C reach the fully closed position and the point where the total flow area of the second group throttling portions A', D' or B', C' is smaller than the flow area of the throttling portion 67 of the variable throttle valve 60 (corresponding to the angular range between θa and θb in FIG. 7), steering assist force remains a constant value determined by the flow area of the throttling portion 67. When the total flow area of the second group throttling portions A', D' or B', C' drops below the flow area of the throttling portion 67 of the variable throttle valve 60, steering assist force generates according to the variation characteristic shown by the line Y of the total flow area of the second group throttling portions A', D' or B', C'.

The difference between the point where the first group throttling portions A, D or B, C reach the fully closed position and the point where the total flow area of the second group throttling portions A', D' and B', C' is smaller than the flow area of the throttling portion 67 of the variable throttle valve 60 (corresponding to the angular difference between θa and θb) is narrowed without narrowing the difference between the point where the first group throttling portions A, D or B, C reach the fully closed position and the point where the second group throttling portions A', D' or B', C' reach the fully closed position (corresponding to the angular difference between θa and θc). To be more precise, suppose that the variation characteristic of the total flow area of the second group throttling portions A' or C' between the hydraulic oil feed slots 51a and the communication slots 50c is represented by the alternate long and short dash line U as is the variation characteristic of the total flow area of the throttling portions B' or D' between the communication slots 50c and the second hydraulic oil outlet slots 51c. The variation characteristic of the total flow area of second group throttling portions A', D' or B', C', versus the angle of relative rotation is represented by an alternate long and two short dashes line M in FIG. 7. In this case, the range between the point where the first group throttling portions A, D or B, C reach the fully closed position and the point where the total flow area of the second group throttling portions A', D' or B', C' is smaller than the flow area of the throttling portion 67 of the variable throttle valve 60 (corresponding to the angular difference between θa and θd) becomes wide, so that the range L where steering assist force is uncontrollable in response to steering resistance becomes wide as shown by the alternate long and two short dashes line in FIG. 6. But, in the above first embodiment, the closing angle θs of each of the second group throttling portions A', C' between the hydraulic oil feed slots 51a and the communication slots 50c is smaller than the closing angle θr of each of the second group throttling portions B', D' between the communication slots 50c and the second hydraulic oil outlet slots 51c, so that the range where steering assist force is uncontrollable in response to steering resistance can be narrowed in medium driving speed condition as shown by dotted line in FIG. 6. Furthermore, at the point where throttling portions A' or C' between the hydraulic oil feed slots 51a and the communication slots 50c are fully closed (corresponding to the angle θe in FIG. 7), throttling portions B' or D' between the communication slots 50c and the second hydraulic oil outlet slots 51c are yet to be opened. Thus, the range where steering assist force can be controlled in response to steering resistance is expanded, so that improved steering feel can be obtained.

Furthermore, according to the first embodiment, the variable throttle valve 60, capable of varying its own throttling portion 67 in response to driving conditions such as the vehicle's speed, is disposed in the oil flow path between the second group throttling portions A' B', C', D' and the tank 71, so that the difference between the hydraulic pressure in the point of the oil flow path wherein the second group throttling portions A', B', C', D' are disposed and the hydraulic pressure in the point of the oil flow path wherein the first group throttling portions A, B, C, D are disposed does not increase. This prevents the cross-sectional elliptical deformation of the first and second valve members 31, 32. In this arrangement, each of the first and second valve members 31, 32 is provided with eight slots; any block for interrupting communication between the first group throttling portions A, B, C, D and the second group throttling portions A', B', C', D' is not needed; and it is not needed that the first group throttling portions A, B, C, D are axially spaced from the second group throttling portions A', B', C', D'. These advantages contribute to the prevention of malfunction of the device, reduction in manufacturing costs, and compact design in radial and axial dimensions of the valve members 31, 32. Also, the four hydraulic oil feed slots 51a are mutually equally spaced, the two left turn slots 50b are mutually equally spaced, the two right turn slots 50a are mutually equally spaced, and the hydraulic oil ted slots 51a are adjacent the left turn slots 50b and the right turn slots 50a. This arrangement allows hydraulic pressure for generating steering assist force to act on the first and second valve members 31, 32 from circumferentially equally spaced two points. Therefore, this arrangement prevents the second valve member 32 from being pressed against the first valve member 31 by unbalanced hydraulic pressure, so that malfunction due to galling of both valve members 31, 32 can be prevented.

Furthermore, at the point where throttling portions A' or C' between the hydraulic oil feed slots 51a and the communication slots 50c are fully closed (corresponding to the angle θe in FIG. 7), throttling portions B' or D' between the communication slots 50c and the second hydraulic oil outlet slots 51c are yet to be opened. Thus, no sharp variation in the flow rate of hydraulic oil occur, so that sound due to oil flow can be lowered.

Embodiment 2

Referring to FIG. 8 through FIG. 14, the second embodiment is discussed. Where the second embodiment is identical to the first embodiment, the same reference numerals are used to denote equivalent features, and only the points of difference are described.

Figure 10:
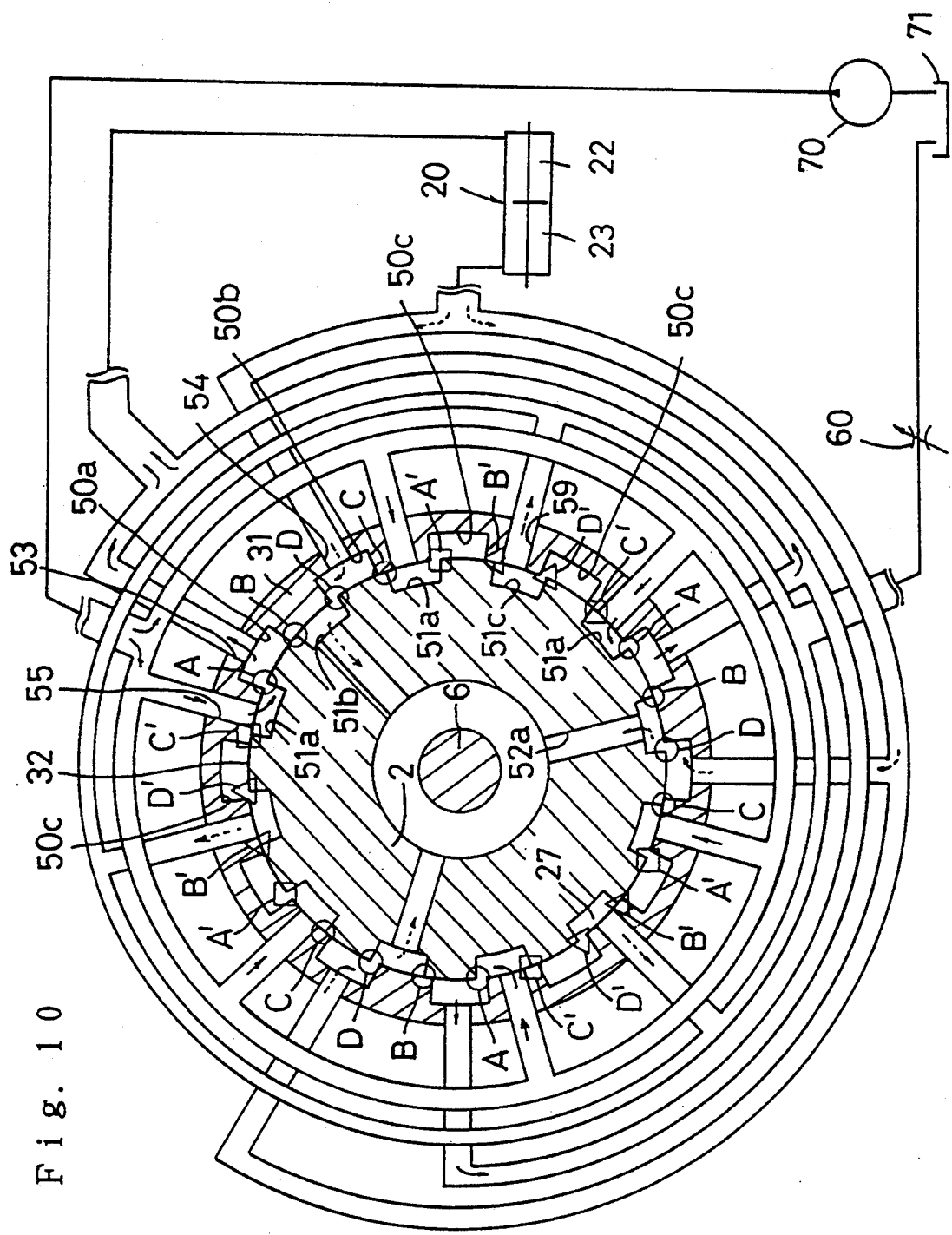
FIG. 10 illustrates the cross-sectional structure of the control valve according to the second embodiment of the present invention.
Figure 11:
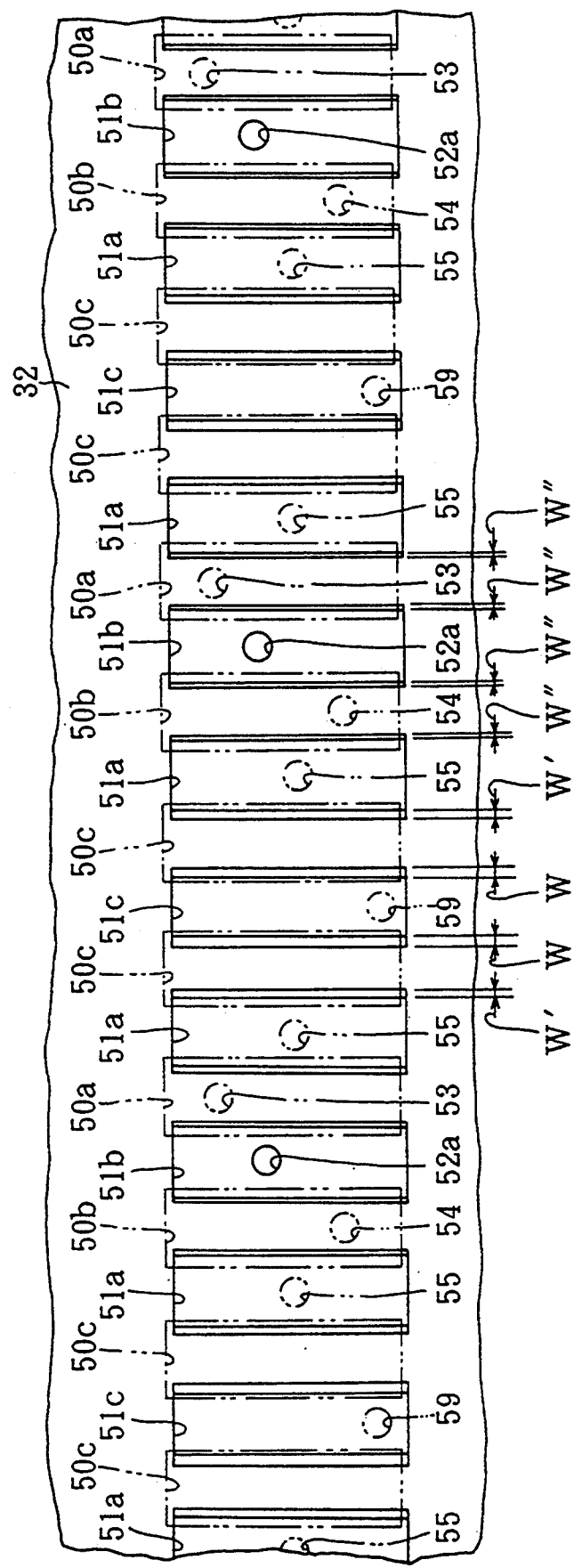
FIG. 11 is a development of the control valve according to the second embodiment of the present invention.

As shown in FIGS. 10 and 11, number of slots 50a, 50b, 50c formed on an inner circumference of a first valve member 31 is twelve in total and the slots 50a, 50b, 50c are formed equally spaced to each other on the inner circumference. Number of slots 51a, 51b, 51c formed on an outer circumference a second valve member 32 is twelve in total and the slots 51a, 51b, 51c are formed equally spaced to each other on the outer circumference. These slots 50a, 50b, 50c, 51a, 51b, 51c constitute oil flow path 27 between both valve members 31, 32. The slots of the first valve member 31 consist of three right turn slots 50a, three left turn slots 50b, and six communication slots 50c. The right turn slots 50a, which are spaced by 120° to each other, are connected to a right turn steering assist oil chamber 22 of a hydraulic cylinder 20 via paths 53 formed in the first valve member 31 and a first port 37. The left turn slots 50b, which are spaced by 120° to each other, are connected to a left turn steering assist oil chamber 23 of the hydraulic cylinder 20 via paths 54 formed in the first valve member 31 and a second port 38. The slots of the second valve member 32 consist of six hydraulic oil feed slots 51a, three first hydraulic oil outlet slots 51b, and three second hydraulic oil outlet slots 51c. The hydraulic oil feed slots 51a, which are spaced by 60° to each other, are connected to a pump 70 via oil inlet paths 55 formed in the first valve member 31 and an inlet port 34. The first hydraulic oil outlet slots 51b, which are spaced by 120° to each other, are connected to a tank 71 via oil flow paths 52a formed in an input shaft 2, the space between the input shaft 2 and the torsion bar 6, oil flow paths 52b (see FIG. 8) formed in the input shaft, and a first outlet port 36. The second hydraulic oil outlet slots 51c, which are spaced by 120° to each other, are connected to a variable throttle valve 60 via oil flow paths 59 formed in the first valve member 31 and a second outlet port 61. The above arrangement constitutes the hydraulic circuit shown by FIG. 9.

Figure 8:
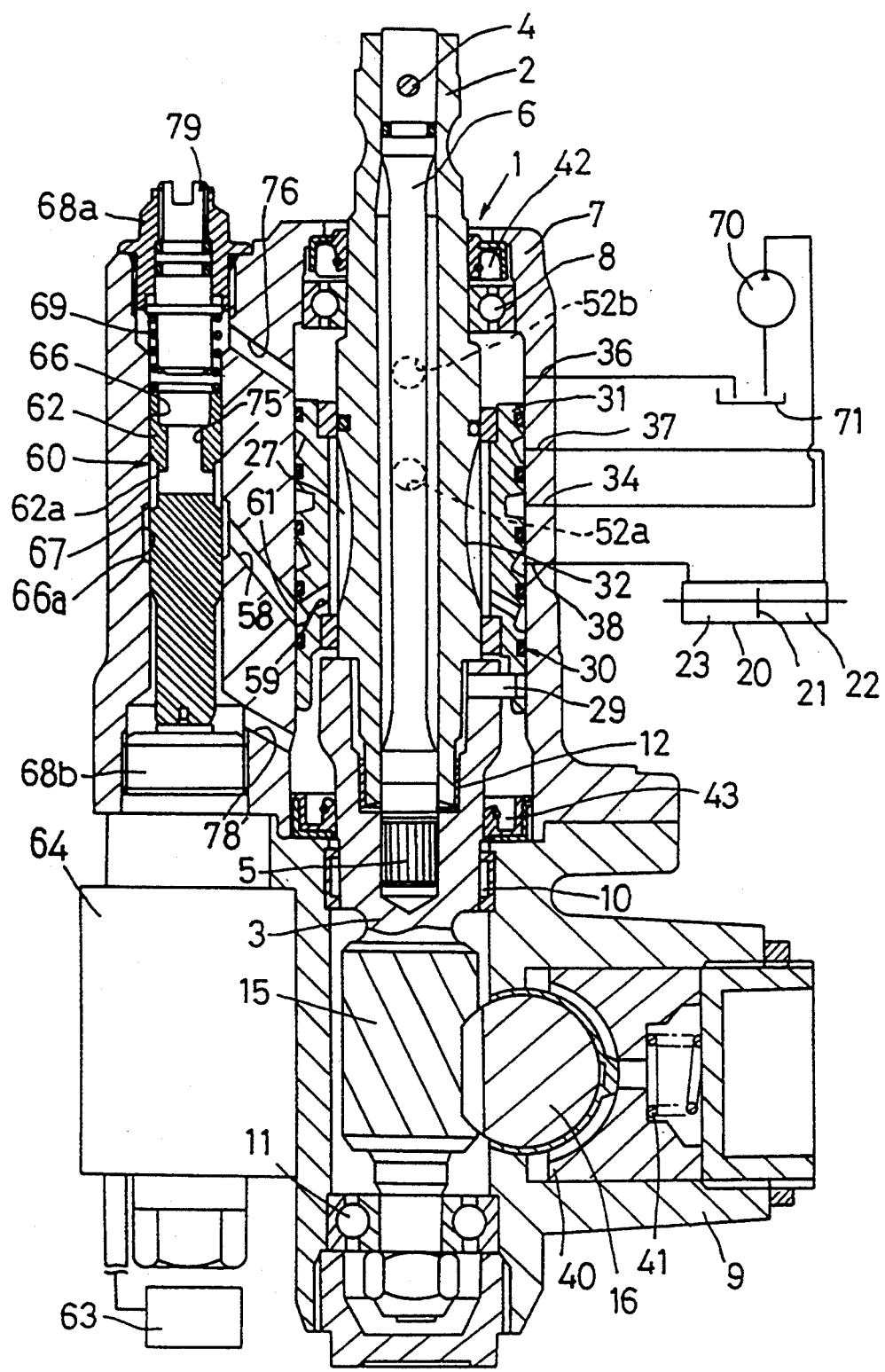
FIG. 8 is a vertical cross-sectional view of a second embodiment of the hydraulic power steering device according to the present invention.
Figure 9:
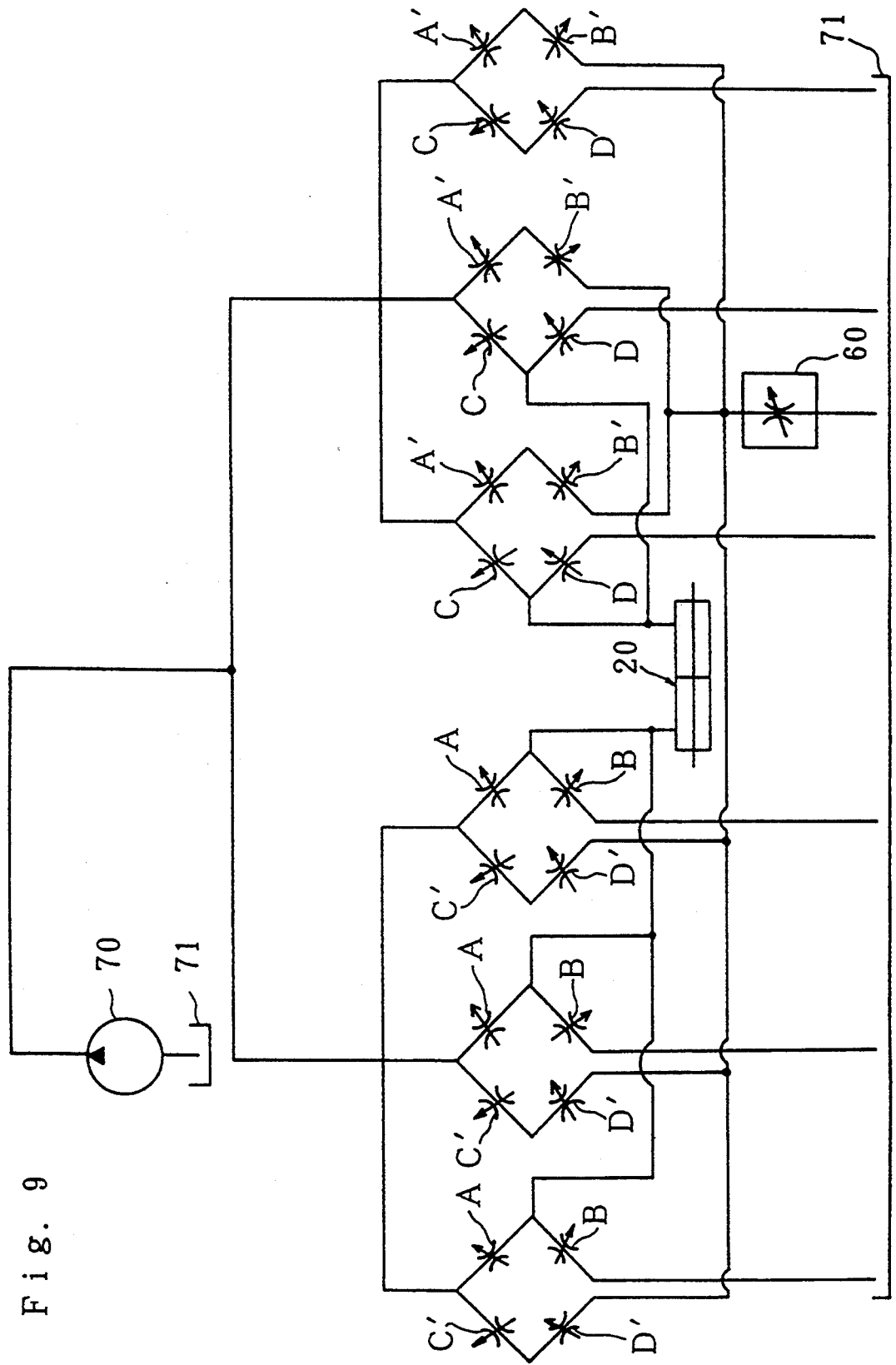
FIG. 9 shows a hydraulic circuit of the second embodiment of the hydraulic power steering device according to the present invention.

The first embodiment uses the drain path 78 to allow the space above the spool 62 to communicate with the space below the spool 62, while in this second embodiment, a valve housing 7 is provided with a drain path 78' that allows a space below a spool 62 to communicate with a space below a rotary control valve 30 as shown by FIG. 8.

Figure 12:
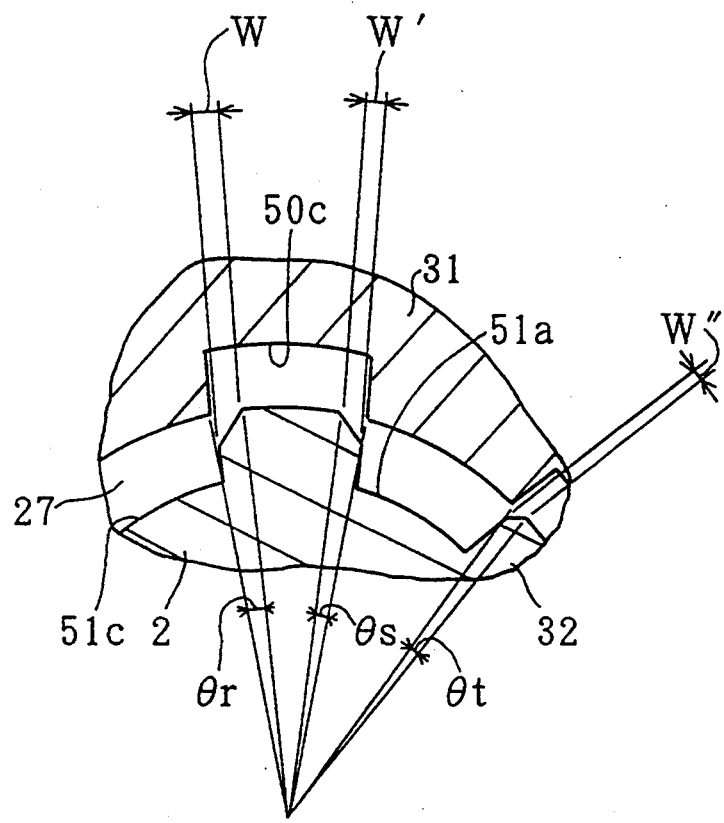
FIG. 12 is an enlarged view of the essential portion of the control valve according to the second embodiment of the present invention.
Figure 14:
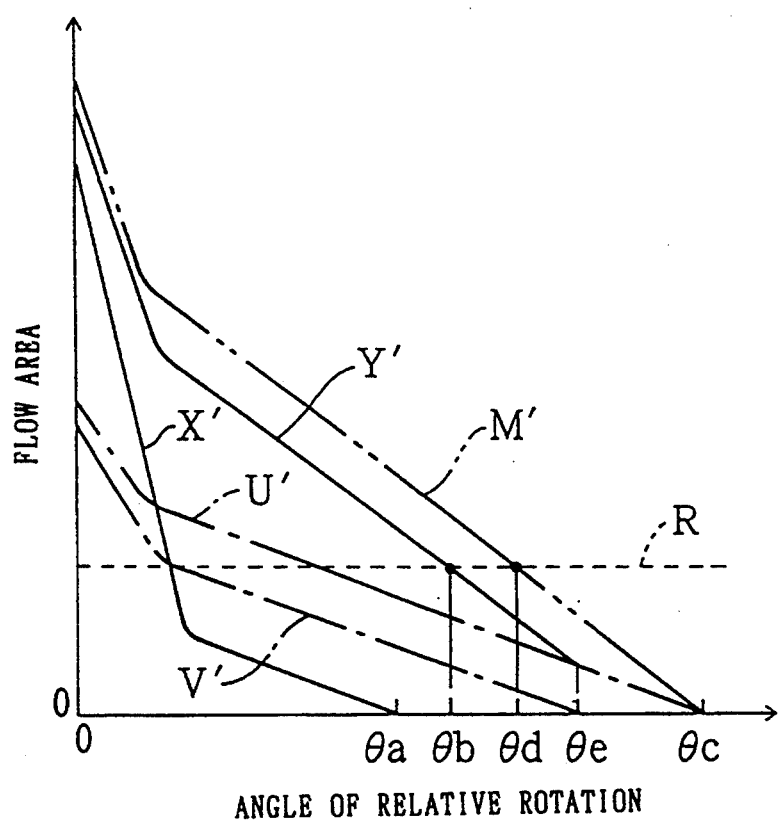
FIG. 14 shows the relationship between the flow area of the throttling portions of the control valve and the angle of relative rotation between the two valve members according to the second embodiment of the present invention.
Figure 15:
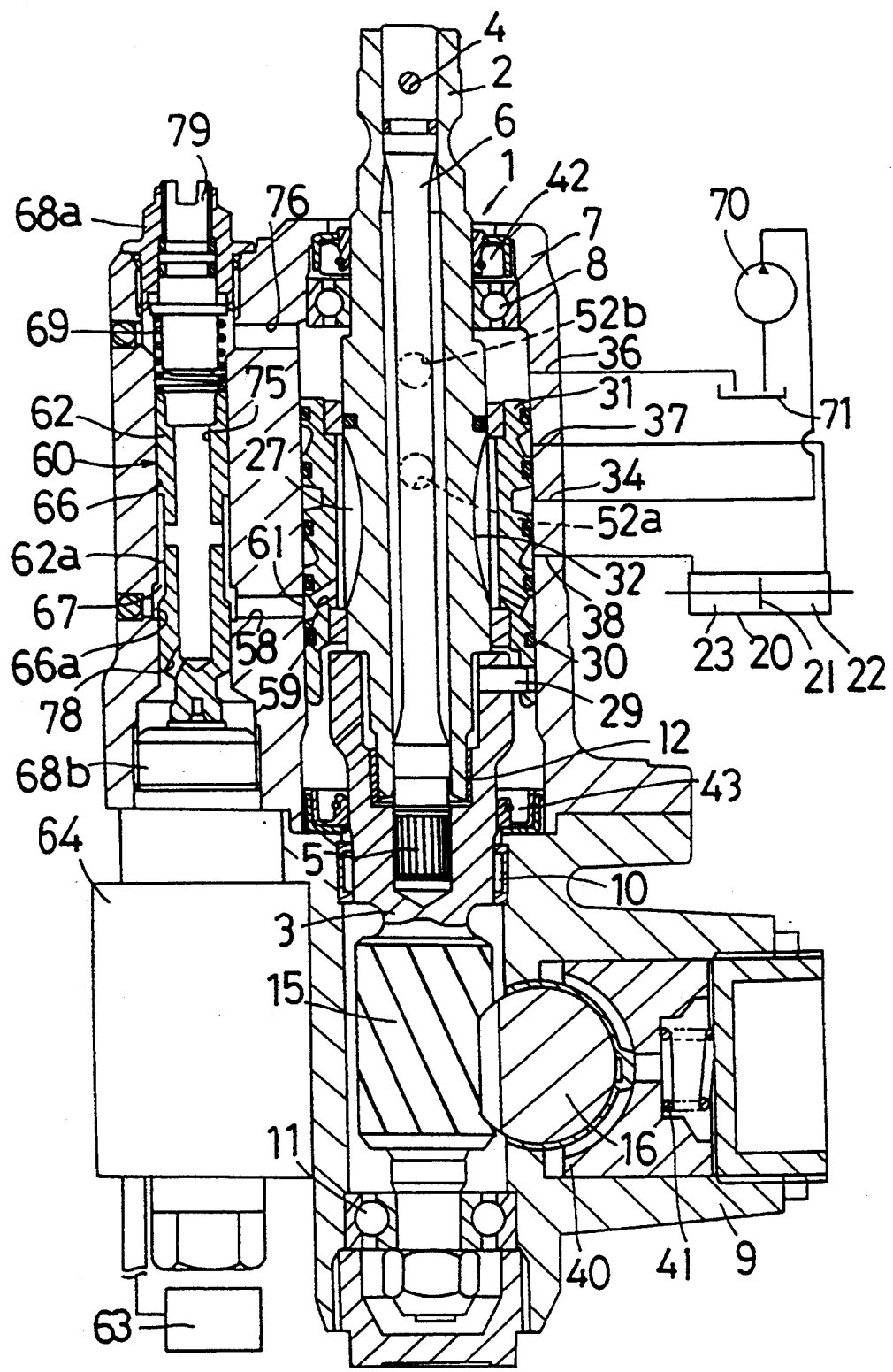
FIG. 15 is a vertical cross-sectional view of a third embodiment of the hydraulic power steering device according to the present invention.
Figure 16:
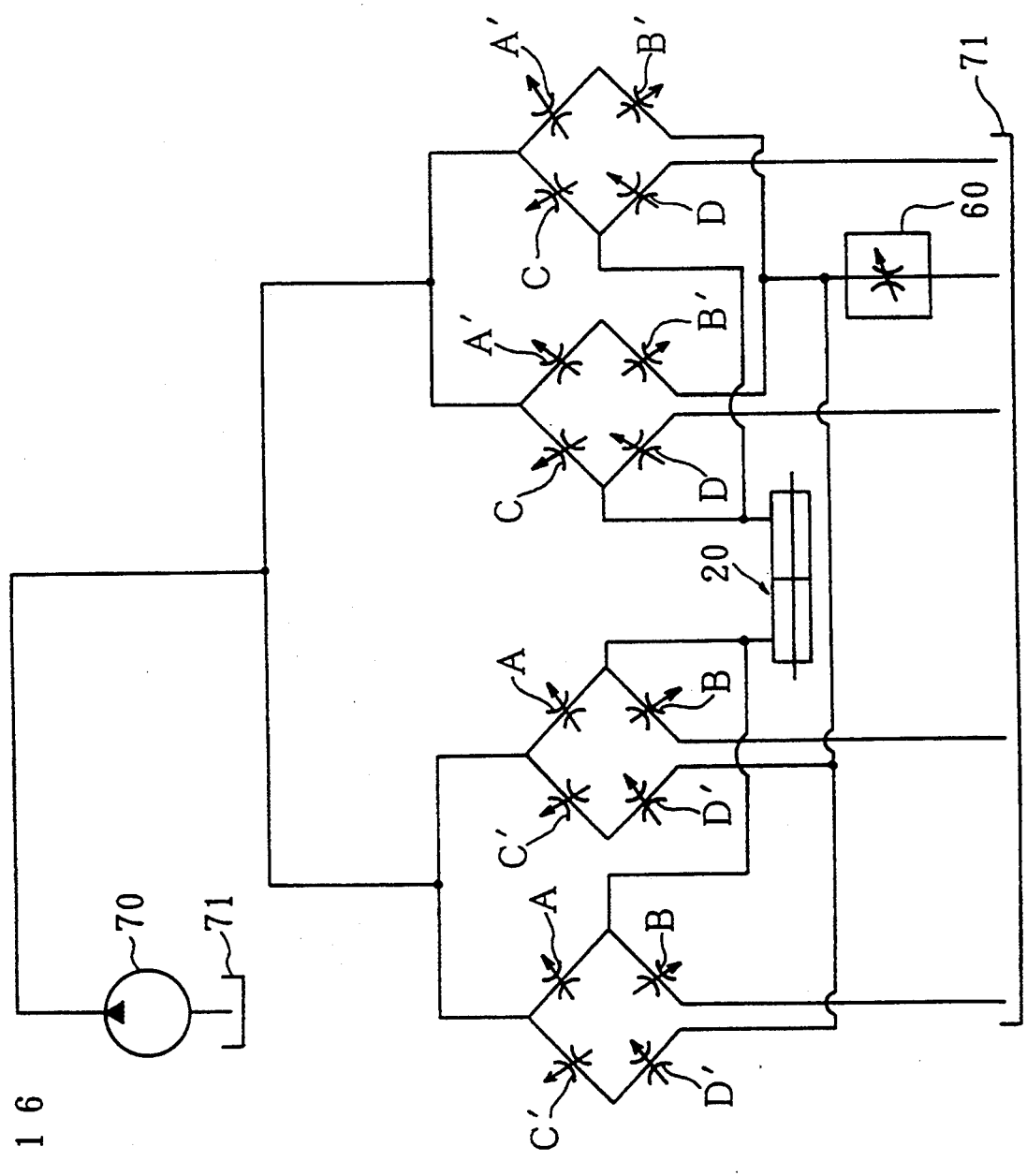
FIG. 16 shows a hydraulic circuit of the third embodiment of the hydraulic power steering device according to the present invention.

As shown by FIG. 11 and FIG. 12, it is assumed that W is a width of each of chamfer areas along axially extending edges (marked by △ in FIG. 10) defined by the second hydraulic oil outlet slots 51c at throttling portions B', D' between the communication slots 50c and the second hydraulic oil outlet slots 51c. It is assumed that W' is a width of each of the chamfer areas along axially extending edges (marked by □ in FIG. 10) defined by the hydraulic oil feed slots 51a at throttling portions A', C' between the hydraulic oil feed slots 51a and the communication slots 50c. It is assumed that W'' is a width of each of chamfer areas along axially extending edges (marked by ○ in FIG. 10) defined by the remaining slots formed on the second valve member 32. The widths W, W', W'' are related as W>W'>W'' as in the first embodiment. Although the configuration of the chamfer area in the second embodiment is diagrammed in FIG. 12 as being the same as those in the first embodiment, diagrammed in FIG. 5, the actual chamfer areas in the second embodiment differ from those in the first embodiment. As shown in FIG. 14, a solid line X' shows the variation characteristic of total flow area of first group throttling portions A, D or B, C versus the angle of relative rotation between both valve members 31, 32. An alternate long and short dash line U' shows the variation characteristic of the total flow area of second group throttling portions B' or D' between the communication slots 50c and the second hydraulic oil outlet slots 51c versus the angle of relative rotation. An alternate long and short dash line V' shows the variation characteristic of total flow area of second group throttling portions A' or C' between the hydraulic oil feed slots 51a and the communication slots 50c versus the angle of relative rotation. A solid line Y' which is combination of the line U' and line V', shows variation characteristic of total flow area of the second group throttling portions A', D' or B', C' versus the angle of relative rotation. Assuming that the variation characteristic of the total flow area of the second group throttling portions A' or C' between the hydraulic oil feed slots 51a and the communication slots 50c is represented by the alternate long and short dash line U' and is the same as that of the throttling portions B' or D' between the communication slots 50c and the second hydraulic oil outlet slots 51c, the variation characteristic of the total flow area of all second group throttling portions A', D' or B', C' versus the angle of relative rotation is represented by an alternate long and two short dashes line M'.

The rest of the characteristic of this second embodiment is identical to those of the first embodiment.

Figure 13:
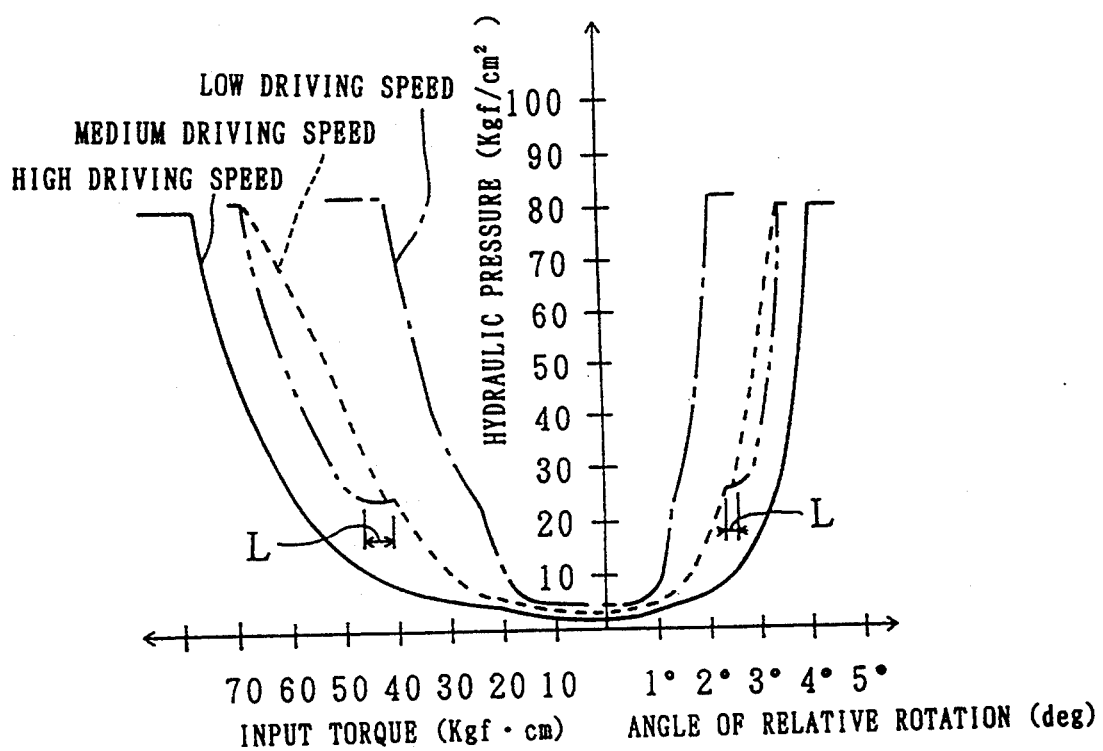
FIG. 13 show the relationship between input torque for steering operation and hydraulic pressure and the relationship between the angle of relative rotation between the two valve members and hydraulic pressure in the hydraulic power steering device according to the second embodiment of the present invention.

The steering characteristic of the second embodiment in low, medium and high driving speed condition remain unchanged from those of the first embodiment as shown by FIG. 13. Also, the six hydraulic oil feed slots 51a are mutually equally spaced, the three left turn slots 50b are mutually equally spaced, the three right turn slots 50a are mutually equally spaced, and the hydraulic oil feed slots 51a are adjacent the left turn slots 50b and the right turn slots 50a. This arrangement allows that hydraulic pressure for generating steering assist force acts on the first and second valve members 31, 32 from circumferentially equally spaced three points. Thereby, this arrangement prevents the second valve member 32 from being pressed against the first valve member 31 by unbalanced hydraulic pressure, so that cross-sectional elliptic deformation on the valve members 31, 32 can be prevented and malfunction due to gall of the both valve members 31, 32 can be certainly prevented. Furthermore, the larger number of slots formed on the valve members 31, 32 becomes, the lower flow rate of oil passing through each throttling portion becomes, so that the level of sound due to oil flow is lowered.

Embodiment 3

Referring now to FIG. 15 through FIG. 20, the third embodiment is discussed. Where the third embodiment is identical to the first embodiment, the same reference numerals are used to denote equivalent features, and only the points of difference are described.

Figure 17:
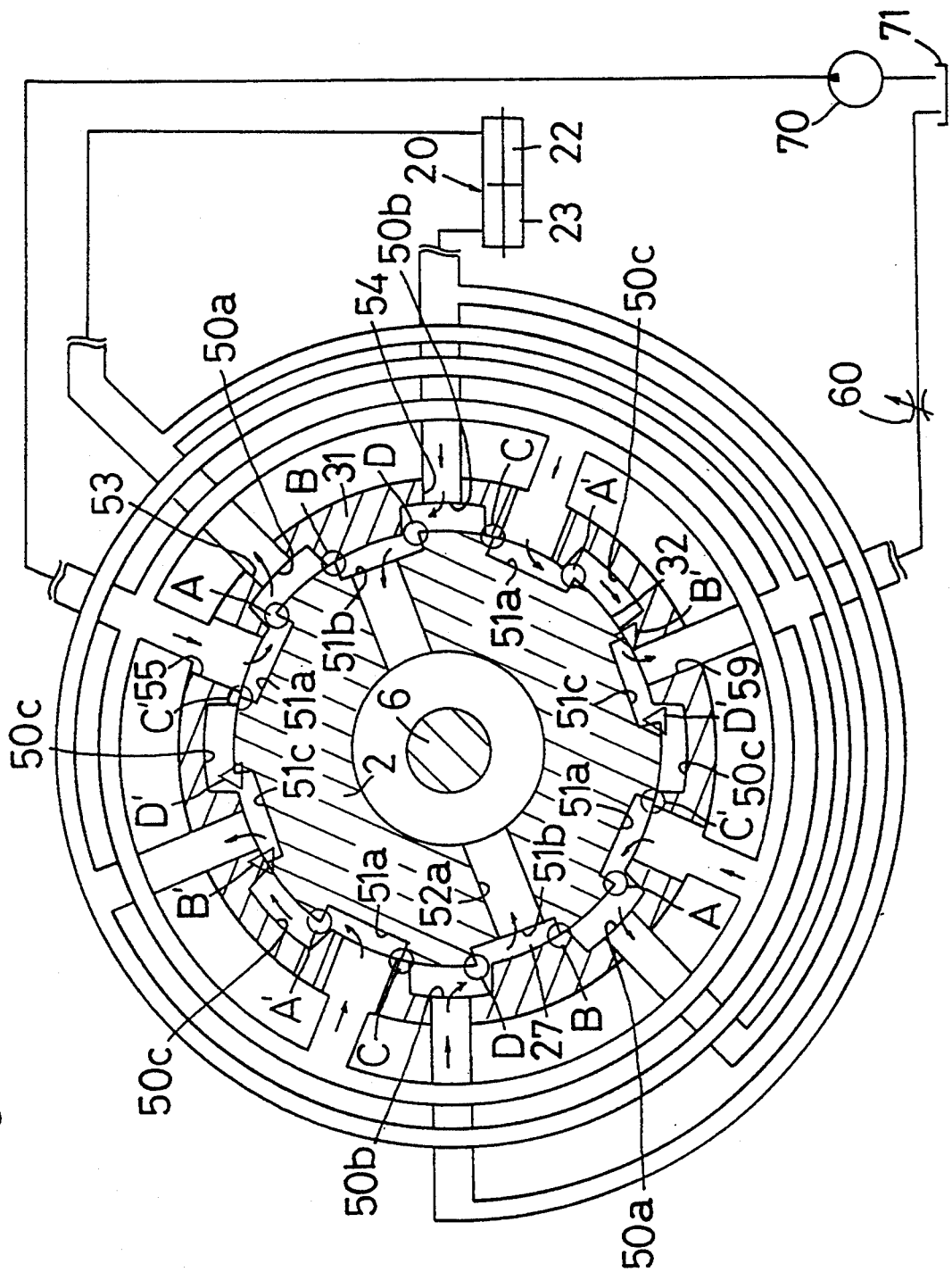
FIG. 17 illustrates the cross-sectional structure of the control valve according to the third embodiment of the present invention.
Figure 18:
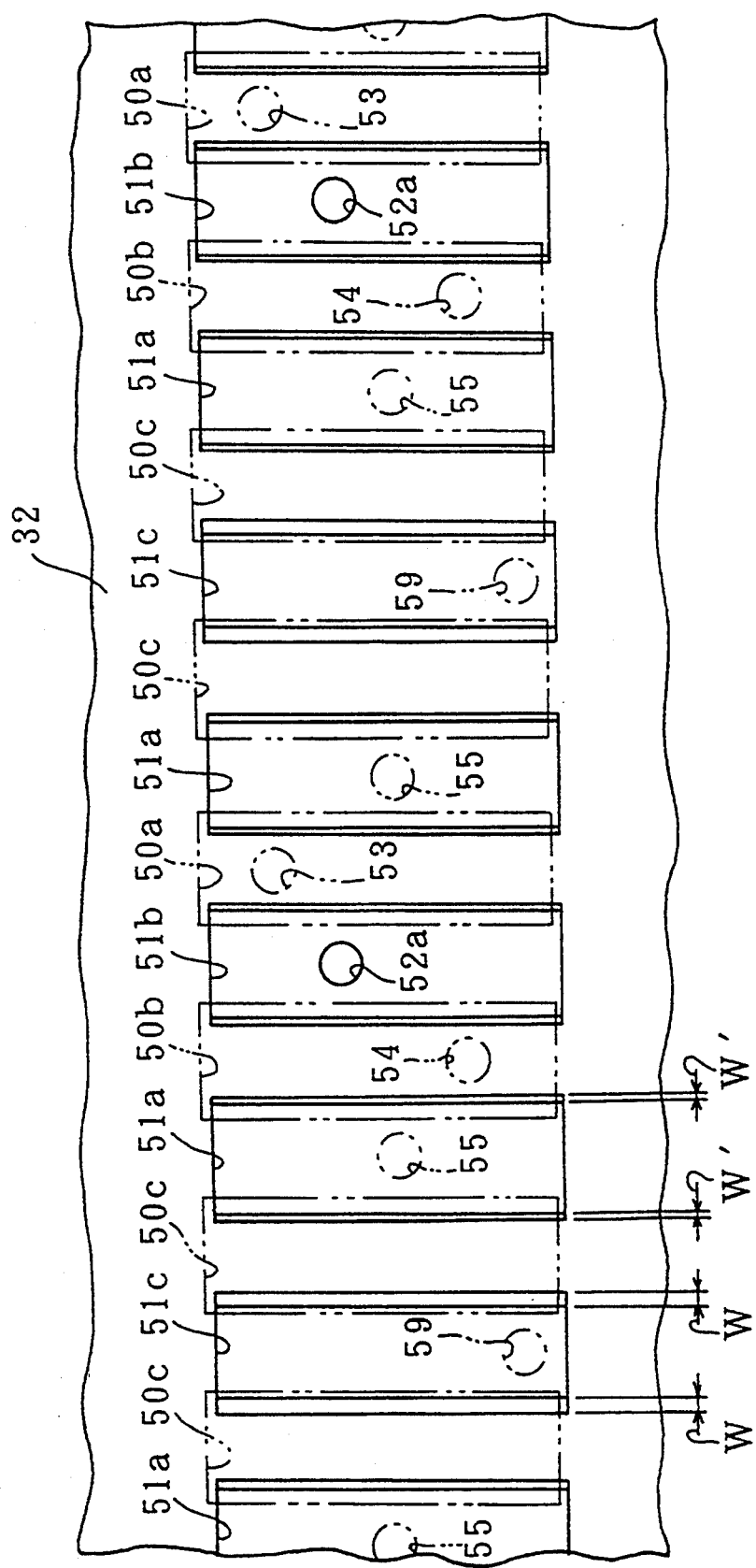
FIG. 18 is a development of the control valve according to the third embodiment of the present invention.
Figure 19:
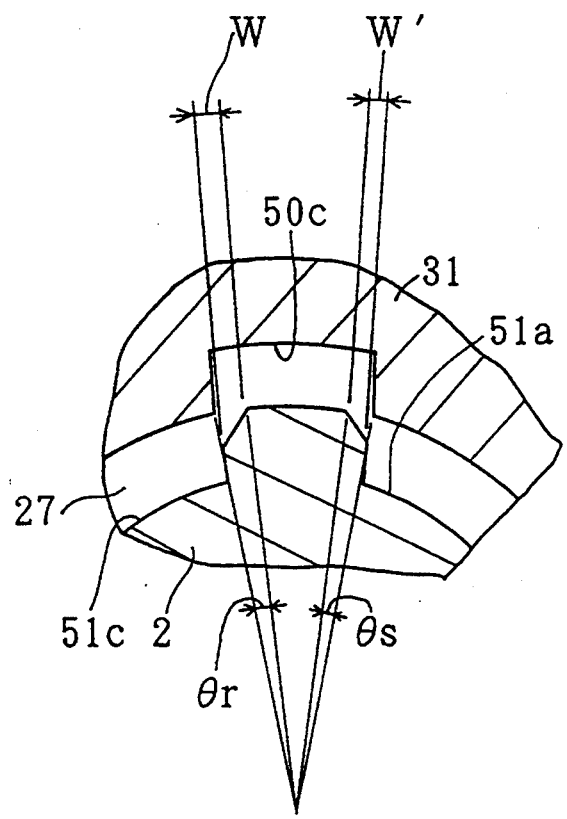
FIG. 19 is an enlarged view of the essential portion of the control valve according to the third embodiment of the present invention.
Figure 20:
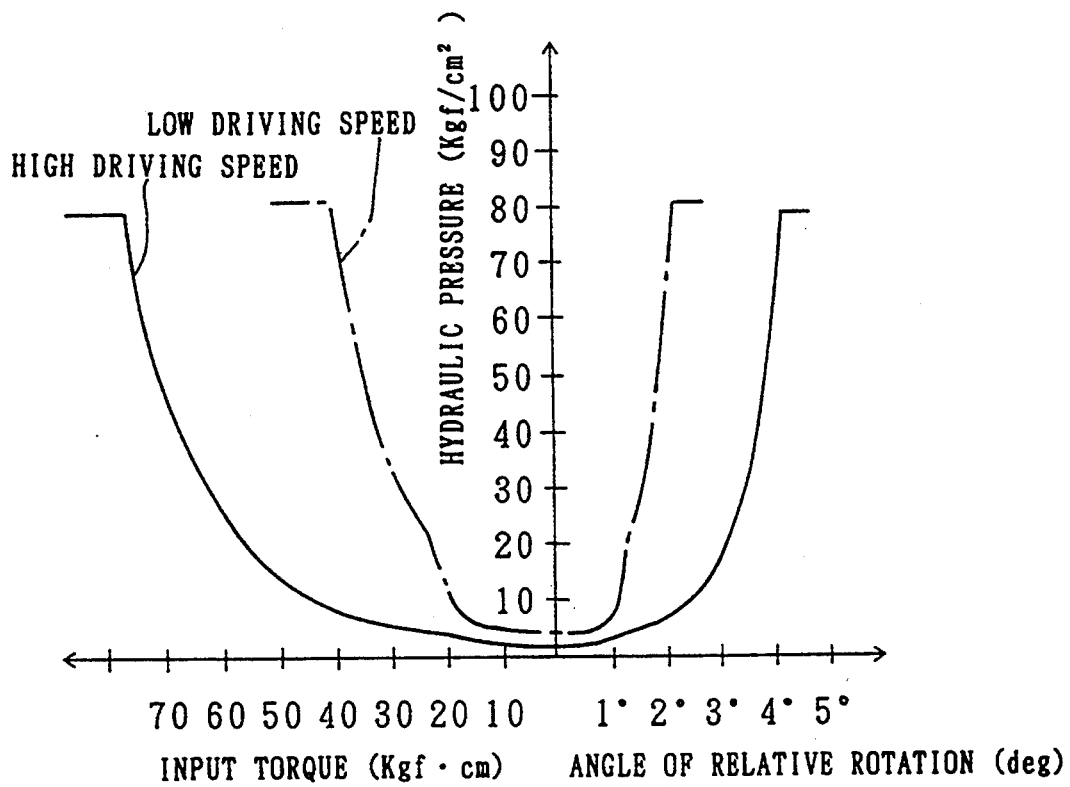
FIG. 20 show the relationship between input torque for steering operation and hydraulic pressure and the relationship between the angle of relative rotation between the two valve members and hydraulic pressure in the hydraulic power steering device according to the third embodiment of the present invention.
Figure 21:
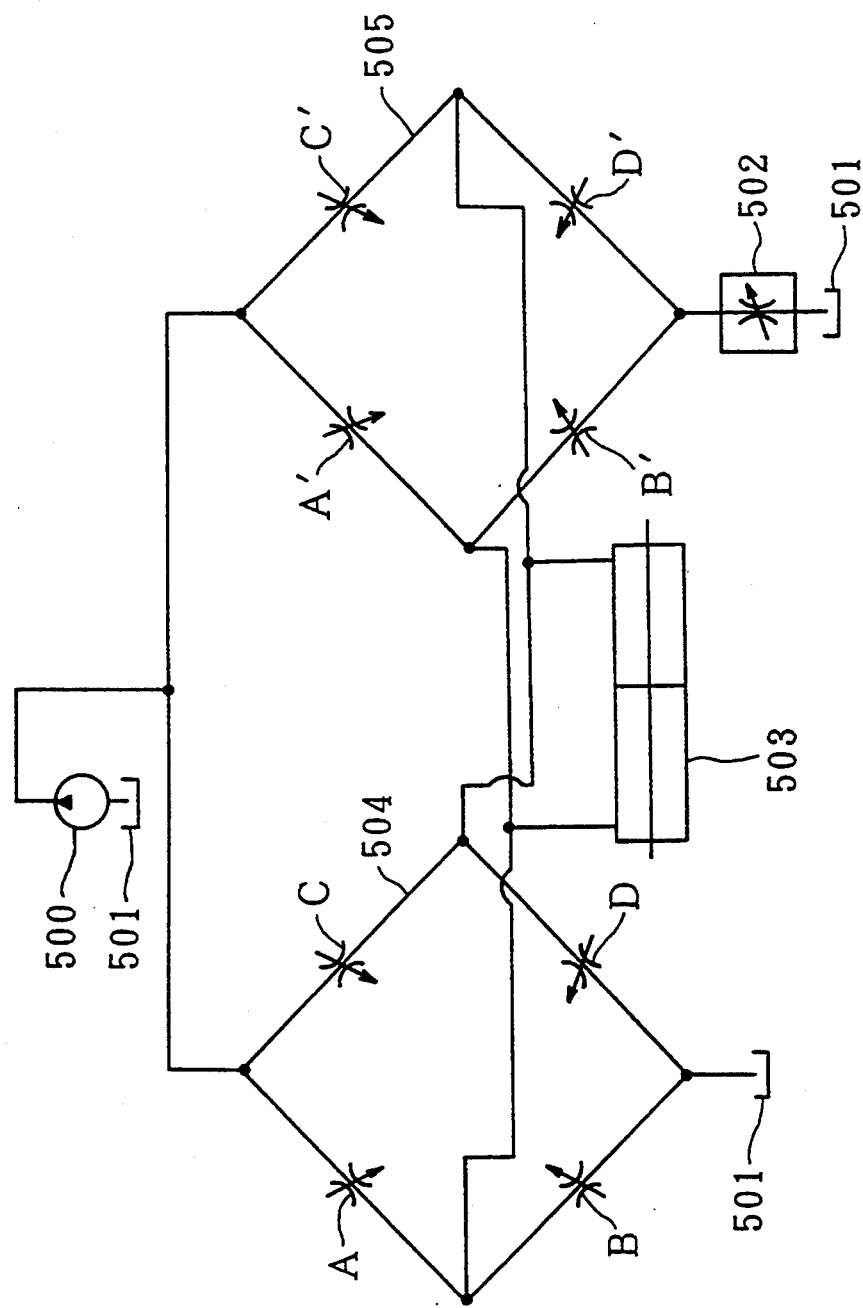
FIG. 21 shows a hydraulic circuit of a conventional power steering device.
Figure 22:
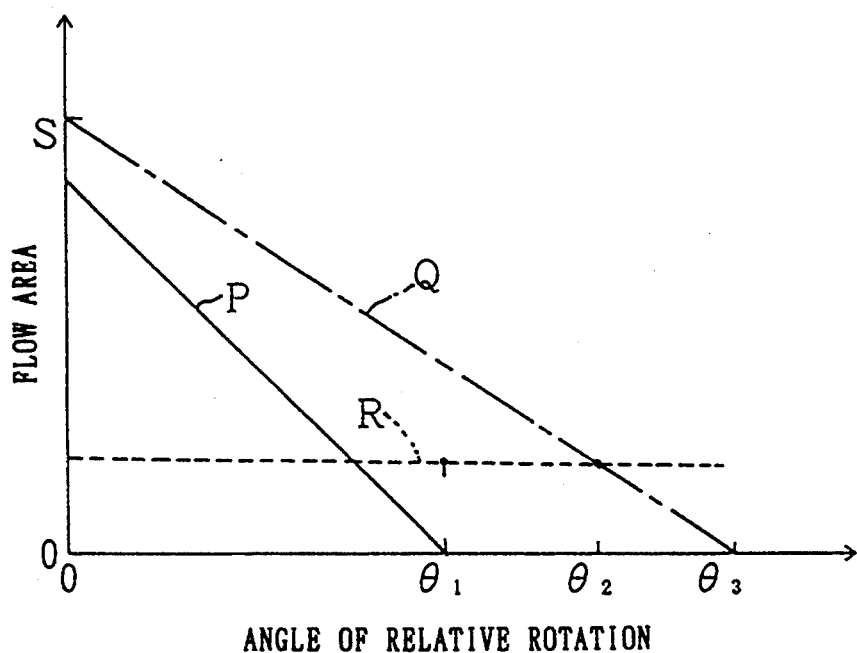
FIG. 22 shows the relationship between the flow area of the throttling portions of the control valve and the angle of relative rotation between the two valve members according to the conventional power steering device.

Axially extending edges defined by slots 51a, 51b, 51c formed on a the second valve member 32 are chamfered as shown in FIG. 17 through FIG. 19. It is assumed that W is width of each of chamfer areas along axially extending edges (marked by a in FIG. 17) defined by second hydraulic oil outlet slots 51c at throttling portions B', D' between the communication slots 50c and the second hydraulic oil outlet slots 51c. It is assumed that W' is width of each of chamfer areas along axially extending edges (marked ◯ by in FIG. 17) by remaining slots formed on the second valve member 32. The widths W, W' are related as W>W' as shown in FIG. 18 and FIG. 19. An angle of relative rotation between two valve members 31, 32 required to fully close each of throttling portions A, A', B, B', C, C', D, D' in the state of no steering resistance (in the state of FIG. 18 and FIG. 19), i.e., the closing angle, is related with each other as follows: The closing angle $\theta r$ of each of the throttling portions B', D' between the communication slots 50c and the second hydraulic oil outlet slots 51c is greater than the closing angle $\theta s$ of each of the remaining throttling portions A, A', B, C, C', D. The throttling portions A between the right turn slots 50a and the hydraulic oil feed slots 51a, throttling portions C between the left turn slots 50b and the hydraulic oil feed slots 51a, throttling portions B between the right turn slots 50a and the first hydraulic oil outlet slots 51b and throttling portions D between the left turn slots 50b and the first hydraulic oil outlet slot 51b belong to the first group, and the remaining throttling portions A' B', C', D' belong to the second group. The closing angle $\theta r$ of each of the second group throttling portions B', D' between the communication slots 50c and the second hydraulic oil outlet slots 51c is greater than the closing angle $\theta s$ of each of the first group throttling portions A, B, C, D. The closing angle $\theta s$ of each of the second group throttling portions A', C' between the hydraulic oil feed slots 51a and the communication slots 50c is set equal to the closing angle $\theta s$ of each of the first group throttling portions A, B, C, D.

The rest of the characteristic of this third embodiment is identical to those of the first embodiment.

According to the third embodiment, a variable throttle valve 60, capable of varying its own throttling portion 67 in response to driving conditions such as the vehicle's speed, is disposed in an oil flow path between the second group throttling portions A', B', C', D' and the tank 71, so that difference between the hydraulic pressure in the oil flow path wherein the second group throttling portions A', B', C', D' are disposed and the hydraulic pressure in the oil flow path wherein the first group throttling portions A, B, C, D are disposed does not increase. This prevents the cross-sectional elliptical deformation of the first and second valve members 31, 32. In this arrangement, each of the first and second valve members 31, 32 is provided with eight slots; any block for interrupting communication between the first group throttling portions A, B, C, D and the second group throttling portions A' B', C', D' is not needed; and it is not necessary for the first group throttling portions A, B, C, D to be axially spaced from the second group throttling portions A', B', C', D'. These advantages contribute to the prevention of malfunction of the device, reduction in manufacturing costs, and compact design in radial and axial dimensions of the valve members 31, 32. Also, the four hydraulic oil feed slots 51a are mutually equally spaced, the two left turn slots 50b are mutually equally spaced, the two right turn slots 50a are mutually equally spaced, and the hydraulic oil feed slots 51a are adjacent the left turn slots 50b and the right turn slots 50a. This arrangement allows the hydraulic pressure for generating steering assist force to act on the first and second valve members 31, 32 from circumferentially equally spaced two points. Therefore, this arrangement prevents the second valve member 32 from being pressed against the first valve member 31 by unbalanced hydraulic pressure, so that malfunction due to galling of the both valve members 31, 32 can be prevented.

The present invention is not limited to the above embodiments. For example, in the first and second embodiments, the closing angle of each of throttling portions B', D' between the communication slots 50c and the second hydraulic oil outlet slots 51c may be set equal to the closing angle of each of the throttling portions A', C' between the hydraulic oil feed slots 51a and the communication slots 51c. In the above embodiments, the present invention is applied to the rack-and-pinion type hydraulic power steering device, alternatively, the present invention can be applied to a ball screw type power steering device. In the above embodiments, the flow area of the variable throttle valve is varied in response to the vehicle's driving speed, alternatively, it can be varied in response to other driving conditions, such as an angle of steer.

I claim:

1. A hydraulic power steering device having a hydraulic actuator for generating steering assist force and a hydraulic control valve;

the hydraulic control valve comprising a cylindrical first valve member having an inner circumference and a second valve member having an outer circumference which is inserted in the first valve member so as to be rotatable relative to the first valve member in accordance with steering resistance; wherein a plurality of slots circumferentially spaced to each other are formed on the inner circumference of the first valve member, and a plurality of slots circumferentially spaced to each other are formed on the outer circumference of the second valve member;

spaces between axially extending edges defined by the slots of the first valve member and axially extending edges defined by the slots of the second valve member constitute throttling portions, each of the throttling portions is positioned in an oil flow path via which a pump, a tank and the hydraulic actuator communicate with each other so as to generate steering assist force in response to a direction of steer and steering resistance;

the slots comprise at least four hydraulic oil feed slots connected to the pump, at least two first and at least two second hydraulic oil outlet slots connected to the tank, at least two right turn slots connected to a right turn steering assist oil chamber of the hydraulic actuator, at least two left turn slots connected to a left turn steering assist oil chamber of the hydraulic actuator, and at least two communication slots;

the first hydraulic oil outlet slots are each located between a right turn slot and a left turn slot, the second hydraulic oil outlet slots are each located between two communication slots, and the hydraulic oil feed slots are each located between a right turn slot and a communication slot and between a left turn slot and communication slot;

the throttling portions between a right turn slot and a hydraulic oil feed slot, throttling portions between a right turn slot and a first hydraulic oil outlet slot, throttling portions between a left turn slot and a hydraulic oil feed slot, and throttling portions between a left turn slot and a first hydraulic oil outlet slot belong to a first group;

the throttling portions between a communication slot and a hydraulic oil feed slot and the throttling portions between a communication slot and a second hydraulic oil outlet slot belong to a second group;

the throttling portions belonging to the second group are divided into two types, of which one type is disposed between a communication slot and a hydraulic oil feed slot and another type is disposed between communication slot and a second hydraulic oil outlet slot a closing angle of each of at least one type of the second group throttling portions is set larger than a closing angle of each of the first group throttling portions; and a variable throttle valve, capable of varying flow area of its own throttling portion in response to a driving condition, is disposed in an oil flow path connecting a second group throttling portion to the tank.

2. The hydraulic power steering device according to claim 1, wherein closing angle of each of the second group throttling portions is set larger than the closing angle of each of the first group throttling portions, and the closing angle of each of one type of the second group throttling portions is different than a closing angle of each of another type of the second group throttling portions.

3. The hydraulic power steering device according to claim 1, wherein the number of the slots formed on the inner circumference of the first valve member is eight and these slots are formed equally spaced to each other on the inner circumference of the first valve member, and the number of the slots formed on the outer circumference of the second valve member is eight and these slots are formed equally spaced to each other on the outer circumference of the second valve member; and the hydraulic oil feed slots are mutually equally spaced, the first hydraulic oil outlet slots are mutually equally spaced, the second hydraulic oil outlet slots are mutually equally spaced, the right turn slots are mutually equally spaced, and the left turn slots are mutually equally spaced.

4. The hydraulic power steering device according to claim 2, wherein the number of the slots formed on the inner circumference of the first valve member is eight and these slots are formed equally spaced to each other on the inner circumference of the first valve member and the number of the slots formed on the outer circumference of the second valve member is eight and these slots are formed equally' spaced to each other on the outer circumference of the second valve member; and the hydraulic oil feed slots are mutually equally spaced, the first hydraulic oil outlet slots are mutually equally spaced, the right turn slots are mutually equally spaced, and the left turn slots are mutually equally spaced.

5. The hydraulic power steering device according to claim 1, wherein the number of slots formed on the inner circumference of the first valve member is twelve and these slots are formed equally spaced to each other on the inner circumference of the first valve member, and the number of the slots formed on the outer circumference of the second valve member is twelve and these slots are formed equally spaced to each other on the outer circumference of the second valve member; and the hydraulic oil feed slots are mutually spaced, the first hydraulic oil outlet slots are mutually equally spaced, the second hydraulic oil outlet slots are mutually equally spaced, the right turn slots are mutually equally spaced, and the left turn slots are mutually equally spaced.

6. The hydraulic power steering device according to claim 2, wherein the number of the slots formed on the inner circumference of the first valve member is twelve and these slots are formed equally spaced to each other on the inner circumference of the first valve member, and the number of the slots formed on the outer circumference of the second valve member is twelve and these slots are formed equally spaced to each other on the outer circumference of the second valve member; and the hydraulic oil feed slots are mutually spaced, the first hydraulic oil outlet slots are mutually equally spaced, the second hydraulic oil outlet slots are mutually equally spaced, the right turn slots are mutually equally spaced, and the left turn slots are mutually equally spaced.

7. A hydraulic power steering device having a hydraulic actuator for generating steering assist force and a hydraulic control valve;

the hydraulic control valve comprising a cylindrical first valve member having an inner circumference and a second valve member having an outer circumference which is inserted in the first valve member so as to be rotatable relative to the first valve member in accordance with steering resistance; wherein a plurality of throttling portions are formed between the inner circumference of the first valve member and the outer circumference of the second valve member, the flow area of each of the throttling portions varies in response to an angle of relative rotation between the first valve member and the second valve member, and each throttling portion is disposed in an oil flow path via which a pump, a tank and the hydraulic actuator communicate with each other so as to generate steering assist force in response to a direction of steer and steering resistance;

the throttling portions are grouped into a first group and a second group, the second group throttling portions are divided into two types, closing angle of each of one type of the second group throttling portions is different than a closing angle of each of another type of the second group throttling portions, and closing angle of each of the second group throttling portions is set larger than closing angle of each of the first group throttling portions; and a variable throttle valve, capable of varying the flow area of its own throttling portion in response to driving conditions, is disposed in an oil flow path connecting the second group throttling portions to the tank.

8. A hydraulic power steering device having a hydraulic actuator for generating steering assist force and a hydraulic control valve;

the hydraulic control valve comprising a cylindrical first valve member having an .inner circumference and a second valve member having an outer circumference which is inserted in the first valve member so as to be rotatable relative to the first valve member in accordance with steering resistance; wherein a plurality of slots circumferentially spaced to each other are formed on the inner circumference of the first valve member, and a plurality of slots circumferentially spaced to each other are formed on the outer circumference of the second valve member;

spaces between axially extending edges defined by the slots of the first valve member and axially extending edges defined by the slots of the second valve member constitute throttling portions, each of the throttling portions is positioned in an oil flow path via which a pump, a tank and the hydraulic actuator communicate with each other so as to generate steering assist force in response to a direction of steer and steering resistance;

the slots comprise at least two hydraulic oil feed slots connected to the pump, first and second hydraulic oil outlet slots connected to the tank, a right turn slot connected to a right turn steering assist oil chamber of the hydraulic actuator, a left turn slot connected to a left turn steering assist oil chamber of the hydraulic actuator, and at least two communication slots;

the first hydraulic oil outlet slot is located between a right turn slot and a left turn slot, the second hydraulic oil outlet slot is located between two communication slots, and the hydraulic oil feed slots are each located between a right turn slot and a communication slot and between a left turn slot and a communication slot;

the throttling portion between a right turn slot and an hydraulic oil feed slot, throttling portion between a right turn slot and a first hydraulic oil outlet slot, throttling portion between a left turn slot and an hydraulic oil feed slot, and throttling portion between a left turn slot and a first hydraulic oil outlet slot belong to a first group;

the throttling portion between a communication slot and an hydraulic oil feed slot and the throttling portion between a communication slot and a second hydraulic oil outlet slot belong to a second group;

the throttling portions belonging to the second group are divided into two types, of which one type is disposed between a communication slot and an hydraulic oil feed slot and another type is disposed between a communication slot and a second hydraulic oil outlet slot, a closing angle of each of at least one type of the second group throttling portions is set larger than a closing angle of each of the first group throttling portions; and a variable throttle valve, capable of varying a flow area of its own throttling portion in response to a driving condition, is disposed in an oil flow path connecting a second group throttling portion to the tank.

9. The hydraulic power steering device according to claim 8, wherein a closing angle of each of the second group throttling portions is set larger than the closing angle of each of the first group throttling portions, and the closing angle of each of one type of the second group throttling portions is different than a closing angle of each of another type of the second group throttling portions.

* * * * *